United States Patent
Asjadi

(10) Patent No.: US 10,637,708 B2
(45) Date of Patent: Apr. 28, 2020

(54) TRANSMITTERS, RECEIVERS AND METHODS OF TRANSMITTING AND RECEIVING

(71) Applicant: SATURN LICENSING LLC, New York, NY (US)

(72) Inventor: Gholam Hosein Asjadi, Guildford (GB)

(73) Assignee: SATURN LICENSING LLC, New York, NY (US)

(*) Notice: Subject to any disclaimer, the term of this patent is extended or adjusted under 35 U.S.C. 154(b) by 0 days.

(21) Appl. No.: 16/055,903

(22) Filed: Aug. 6, 2018

(65) Prior Publication Data
US 2019/0104008 A1  Apr. 4, 2019

Related U.S. Application Data

(63) Continuation of application No. 15/245,263, filed on Aug. 24, 2016, now Pat. No. 10,075,320, which is a (Continued)

(30) Foreign Application Priority Data

Mar. 13, 2013  (GB) .................................. 1304531.5
Jun. 5, 2013  (EP) .................................... 13170706

(51) Int. Cl.
*H04L 27/26* (2006.01)
*H04L 5/00* (2006.01)
(Continued)

(52) U.S. Cl.
CPC ........ *H04L 27/2649* (2013.01); *H04L 5/0048* (2013.01); *H04L 25/0226* (2013.01); (Continued)

(58) Field of Classification Search
CPC . H04L 5/0048; H04L 27/2613; H04L 5/0023; H04L 27/2647; H04L 27/2601;
(Continued)

(56) References Cited

U.S. PATENT DOCUMENTS 7,388,922 B2    6/2008  Yamagata
7,440,506 B2 *  10/2008  Atungsiri ............ H04L 25/0216
                                                    375/260
(Continued)

FOREIGN PATENT DOCUMENTS

CN          1487741 A      4/2004
CN          10569188 A     10/2009
(Continued)

OTHER PUBLICATIONS

European Search Report dated Sep. 12, 2013, in European Application No. GB1304531.5.
(Continued)

*Primary Examiner* — Rahel Guarino
(74) *Attorney, Agent, or Firm* — Oblon, McClelland, Maier & Neustadt, L.L.P.

(57) ABSTRACT

The receiver comprises a demodulator configured to detect a signal representing the OFDM symbols and to generate a sampled digital version of the OFDM symbols in the time domain. A Fourier transform processor is configured to receive the time domain digital version of the OFDM symbols and to form a frequency domain version of the OFDM symbols, from which the pilot symbol bearing sub-carriers and the data symbol bearing sub-carriers can be recovered. A detector is configured to recover the data symbols from the data bearing sub-carriers of the OFDM symbols and to recover the pilot symbols from the pilot bearing sub-carriers of the OFDM symbols in accordance with the continuous pilot symbol pattern. The continuous
(Continued)

pilot symbols are present at the same sub-carrier locations in first OFDM symbols and as second OFDM symbols. A transmitter is also provided.

21 Claims, 17 Drawing Sheets

Related U.S. Application Data continuation of application No. 14/721,886, filed on May 26, 2015, now Pat. No. 9,432,235, which is a continuation of application No. 14/209,328, filed on Mar. 13, 2014, now Pat. No. 9,065,711.

(51) Int. Cl.
*H04L 25/02* (2006.01)
*H04L 25/03* (2006.01)
*H04L 1/00* (2006.01)

(52) U.S. Cl.
CPC ........ *H04L 27/2601* (2013.01); *H04L 27/265* (2013.01); *H04L 27/2613* (2013.01); *H04L 27/2647* (2013.01); *H04L 27/2666* (2013.01); *H04L 1/0057* (2013.01); *H04L 1/0071* (2013.01); *H04L 27/2626* (2013.01); *H04L 27/2627* (2013.01); *H04L 27/2671* (2013.01); *H04L 27/2672* (2013.01); *H04L 27/2675* (2013.01); *H04L 2025/03414* (2013.01)

(58) Field of Classification Search
CPC ......... H04L 2025/03414; H04L 5/0005; H04L 25/03159; H04L 27/265; H04L 5/0046; H04L 27/2634; H04N 21/23439; H04B 2201/70701
See application file for complete search history.

(56) References Cited

U.S. PATENT DOCUMENTS

| | | | |
|---|---|---|---|
| 9,008,203 B2 | 4/2015 | Asjadi | |
| 9,065,711 B2 | 6/2015 | Asjadi | |
| 9,065,771 B2 | 6/2015 | Bender et al. | |
| 9,369,325 B2 | 6/2016 | Kim et al. | |
| 9,432,235 B2 | 8/2016 | Asjadi | |
| 9,774,893 B2 | 9/2017 | Moon et al. | |
| 2005/0159132 A1 | 7/2005 | Wright et al. | |
| 2006/0072623 A1 | 4/2006 | Park | |
| 2007/0079337 A1 | 4/2007 | Vincent | |
| 2007/0171889 A1 | 7/2007 | Kwon et al. | |
| 2007/0204291 A1 | 8/2007 | Ichihashi | |
| 2008/0043712 A1 | 2/2008 | Hart et al. | |
| 2008/0101306 A1 | 5/2008 | Bertrand et al. | |
| 2008/0225892 A1 | 9/2008 | Vare et al. | |
| 2008/0316961 A1 | 12/2008 | Bertrand et al. | |
| 2009/0154547 A1 | 6/2009 | Yousef | |
| 2009/0168909 A1 | 7/2009 | Stadelmeier et al. | |
| 2009/0180596 A1 | 7/2009 | Reynolds et al. | |
| 2009/0239497 A1 | 9/2009 | Sennett et al. | |
| 2009/0251315 A1 | 10/2009 | Lee et al. | |
| 2009/0257520 A1 | 10/2009 | Lin et al. | |
| 2009/0276804 A1 | 11/2009 | Hamada et al. | |
| 2010/0105405 A1 | 4/2010 | Vujcic | |
| 2010/0118994 A1 | 5/2010 | Park et al. | |
| 2010/0124292 A1 | 5/2010 | Rajagopal | |
| 2010/0124300 A1 | 5/2010 | Rajagopal | |
| 2010/0158047 A1 | 6/2010 | Lee et al. | |
| 2010/0210243 A1 | 8/2010 | Vujcic | |
| 2010/0284477 A1 | 11/2010 | Kwon et al. | |
| 2010/0322184 A1 | 12/2010 | Xiao | |
| 2011/0002378 A1 | 1/2011 | Raveendran | |
| 2011/0007730 A1 | 1/2011 | Han et al. | |
| 2011/0013720 A1 | 1/2011 | Lee et al. | |
| 2011/0019622 A1 | 1/2011 | Lee et al. | |
| 2011/0096867 A1 | 4/2011 | Kang et al. | |
| 2011/0154391 A1 | 6/2011 | Velazquez et al. | |
| 2011/0197223 A1 | 8/2011 | Ravula | |
| 2011/0212701 A1 | 9/2011 | Xing | |
| 2011/0289527 A1 | 11/2011 | Wei | |
| 2011/0299381 A1 | 12/2011 | Ge et al. | |
| 2012/0028570 A1 | 2/2012 | Sun et al. | |
| 2012/0030703 A1 | 2/2012 | Strong | |
| 2012/0148210 A1 | 6/2012 | Ichihashi | |
| 2012/0183022 A1 | 7/2012 | Stadelmeier et al. | |
| 2012/0243629 A1 | 9/2012 | van Houtum et al. | |
| 2013/0023227 A1 | 1/2013 | Yokoyama | |
| 2014/0010179 A1 | 1/2014 | Lee | |
| 2014/0010180 A1 | 1/2014 | Lee et al. | |
| 2014/0064263 A1 | 3/2014 | Cheng et al. | |
| 2014/0071957 A1 | 3/2014 | Xu et al. | |
| 2014/0133332 A1 | 5/2014 | Lee et al. | |
| 2014/0269981 A1 | 9/2014 | Asjadi | |
| 2014/0294124 A1 | 10/2014 | Atungsiri et al. | |
| 2015/0071153 A1 | 3/2015 | Hong et al. | |
| 2015/0078473 A1 | 3/2015 | Ko et al. | |
| 2015/0163085 A1 | 6/2015 | Stadelmeier et al. | |
| 2015/0256375 A1 | 9/2015 | Asjadi | |
| 2015/0334758 A1 | 11/2015 | Kim et al. | |
| 2016/0044693 A1 | 2/2016 | Sun et al. | |
| 2017/0142497 A1 | 5/2017 | Kim et al. | |
| 2019/0122536 A1 | 4/2019 | Mccormick | |

FOREIGN PATENT DOCUMENTS

| | | |
|---|---|---|
| CN | 101854324 A | 10/2010 |
| CN | 102292951 A | 12/2011 |
| CN | 102652415 A | 8/2012 |
| DE | 102 10 656 A1 | 5/2003 |
| EP | 2 071 757 A1 | 6/2009 |
| JP | 2007-228046 | 9/2007 |
| JP | 2010-136434 A | 6/2010 |
| KR | 10-2010-0001687 | 1/2010 |
| TW | 443059 B | 6/2001 |
| WO | WO 2008/129845 A1 | 10/2008 |
| WO | WO 2011/120213 A1 | 10/2011 |

OTHER PUBLICATIONS

Jong-Seob Baek et al. "Efficient Pilot Patterns and Channel Estimations for MIMO-OFDM Systems," Sections II-III, IEEE Transcribers on Broadcasting, vol. 58, No. 4, Dec. 2012, pub. IEEE, US, pp. 648-653.
ETSI EN 302 755 V1.3.1 (Apr. 2012). Digital Viedo Broadcasting (DVB); Frame structure channel coding and modulation for a second generation digital terrestrial television broadcasting system (DVB-T2): European standard; pp. 1-188.
International Search Report and Written Opinion dated Apr. 29, 2014 in PCT/GB2014/050441.
Office Action dated Oct. 20, 2016 in Canadian Patent Application No. 2,904,775.
Mexican Office Action dated Apr. 19, 2017 in Patent Application No. MX/a/2015/016515.
Office Action dated Aug. 14, 2017 in co-pending U.S. Appl. No. 14/894,131.
Mexican Office Action dated Apr. 19, 2017 in Patent Application No. MX/a/2015/016515 (previously filed, submitting with English translation).
Combined Chinese Office Action and Search Report dated Dec. 28, 2017 in corresponding Patent Application No. 201480032596.1 (with English Translation) 21 pages.
International Search Report dated Oct. 7, 2014 in PCT/EP14/061467 Filed Jun. 3, 2014.
Search Report dated Oct. 16, 2017 in Chinese Patent Application No. 201480014485.8 (with English language translation of Combined Office Action and Search Report).

\* cited by examiner

| FFT size (Number of Continual Pilots) | Bandwidth Extended Mode | Continual Pilot Carrier Indices |
|---|---|---|
| 8K (44) | Off | Set(A)={41, 173, 357, 505, 645, 805, 941, 1098, 1225,1397, 1514, 1669, 1822, 1961, 2119, 2245, 2423, 2587, 2709, 2861, 3026, 3189, 3318, 3510, 3683, 3861, 4045, 4163, 4297, 4457, 4598, 4769, 4942, 5113, 5289, 5413, 5585, 5755, 5873, 6045, 6207, 6379, 6525, 6675} |
| 8K (45) | On | Set(A) + {6862} |

FIG. 6

| FFT size (Number of Continual Pilots) | Bandwidth Extended Mode | Continual Pilot Carrier Indices |
|---|---|---|
| 16K (88) | Off | Set(B)={ 82, 243, 346, 517, 714, 861, 1010, 1157, 1290, 1429, 1610, 1753, 1881, 2061, 2197, 2301, 2450, 2647, 2794, 2899, 3027, 3159, 3338, 3497, 3645, 3793, 3923, 4059, 4239, 4409, 4490, 4647, 4847, 5013, 5175, 5277, 5419, 5577, 5723, 5895, 6051, 6222, 6378, 6497, 6637, 6818, 7021, 7201, 7366, 7525, 7721, 7895, 8090, 8199, 8325, 8449, 8593, 8743, 8915, 9055, 9197, 9367, 9539, 9723, 9885, 10058, 10226, 10391, 10578, 10703, 10825, 10959, 11169, 11326, 11510, 11629, 11747, 11941, 12089, 12243, 12414, 12598, 12758, 12881, 13050, 13195, 13349, 13517 } |
| 16K (90) | On | Set(B) + {13725, 13821} |

FIG. 10

| FFT size (Number of Continual Pilots) | Bandwidth Extended Mode | Continual Pilot Carrier Indices |
|---|---|---|
| 32K (176) | Off | Set(C) = {163, 290, 486, 605, 691, 858, 1033, 1187, 1427, 1582, 1721, 1881, 2019, 2217, 2314, 2425, 2579, 2709, 2857, 3009, 3219, 3399, 3506, 3621, 3762, 3997, 4122, 4257, 4393, 4539, 4601, 4786, 4899, 5095, 5293, 5378, 5587, 5693, 5797, 5937, 6054, 6139, 6317, 6501, 6675, 6807, 6994, 7163, 7289, 7467, 7586, 7689, 7845, 8011, 8117, 8337, 8477, 8665, 8817, 8893, 8979, 9177, 9293, 9539, 9693, 9885, 10026, 10151, 10349, 10471, 10553, 10846, 10837, 10977, 11153, 11325, 11445, 11605, 11789, 11939, 12102, 12253, 12443, 12557, 12755, 12866, 12993, 13150, 13273, 13445, 13635, 13846, 14041, 14225, 14402, 14571, 14731, 14917, 15050, 15209, 15442, 15622, 15790, 15953, 16179, 16239, 16397, 16533, 16650, 16750, 16897, 17045, 17186, 17351, 17485, 17637, 17829, 17939, 18109, 18246, 18393, 18566, 18733, 18901, 19077, 19253, 19445, 19589, 19769, 19989, 20115, 20275, 20451, 20675, 20781, 20989, 21155, 21279, 21405, 21537, 21650, 21789, 21917, 22133, 22338, 22489, 22651, 22823, 23019, 23205, 23258, 23361, 23493, 23685, 23881, 24007, 24178, 24317, 24486, 24689, 24827, 25061, 25195, 25331, 25515, 25649, 25761, 25894, 26099, 26246, 26390, 26569, 26698, 26910, 27033, 27241} |
| 32K (180) | On | Set(C) + {27449, 27511, 27642, 27801} |

FIG. 13

TRANSMITTERS, RECEIVERS AND METHODS OF TRANSMITTING AND RECEIVING

CROSS REFERENCE TO RELATED APPLICATIONS

The present application is a continuation application of U.S. patent application Ser. No. 15/245,263, filed Aug. 24, 2016, which is a continuation application of U.S. patent application Ser. No. 14/721,886, filed May 26, 2015 (now U.S. Pat. No. 9,432,235), which is a continuation application of U.S. patent application Ser. No. 14/209,328, filed Mar. 13, 2014 (now U.S. Pat. No. 9,065,711), which claims priority to United Kingdom Application No. 1304531.5 filed Mar. 13, 2013, and European Patent Office Application No. 13170706.9 filed Jun. 5, 2013. The entire contents of the above-identified applications are incorporated herein by reference.

FIELD OF THE DISCLOSURE

The present disclosure relates to transmitters, receivers and methods of transmitting and receiving in an OFDM communications system.

BACKGROUND OF THE DISCLOSURE

There are many examples of radio communications systems in which data is communicated using Orthogonal Frequency Division Multiplexing (OFDM). Systems which have been arranged to operate in accordance with Digital Video Broadcasting (DVB) standards for example, utilise OFDM. OFDM can be generally described as providing K narrow band sub-carriers (where K is an integer) which are modulated in parallel, each sub-carrier communicating a modulated data symbol such as Quadrature Amplitude Modulated (QAM) symbol or Quadrature Phase-shift Keying (QPSK) symbol. The modulation of the sub-carriers is formed in the frequency domain and transformed into the time domain for transmission. Since the data symbols are communicated in parallel on the sub-carriers, the same modulated symbols may be communicated on each sub-carrier for an extended period, which can be longer than a coherence time of the radio channel. The sub-carriers are modulated in parallel contemporaneously, so that in combination the modulated carriers form an OFDM symbol. The OFDM symbol therefore comprises a plurality of sub-carriers each of which has been modulated contemporaneously with different modulation symbols.

To facilitate detection and recovery of the data at the receiver, the OFDM symbol can include pilot sub-carriers, which communicate data-symbols known to the receiver. The pilot sub-carriers provide a phase and timing reference, which can be used to estimate an impulse response of the channel through which the OFDM symbol has passed and perform tasks such as channel estimation and correction, frequency offset estimation etc. These estimations facilitate detection and recovery of the data symbols at the receiver. In some examples, the OFDM symbols include both Continuous Pilot (CP) carriers which remain at the same relative frequency position in the OFDM symbol and Scattered Pilots (SP). The SPs change their relative position in the OFDM symbol between successive symbols, providing a facility for estimating the impulse response of the channel more accurately with reduced redundancy. However, the location of the pilots is required to be known at the receiver so the receiver can extract the pilot symbols from the correct locations across the OFDM sub-carriers.

The development of communications system which utilise OFDM symbols to communicate data can represent a significant and complex task. In particular, the optimisation of communications parameters particular in respect of frequency planning and network deployment can present a significant technical problem requiring considerable effort to identify the communications parameters which are suitable for a communications system which utilises OFDM. As will be appreciated much work has been performed to optimise the parameters of DVB standards and in particular DVB T2.

SUMMARY OF THE DISCLOSURE

A receiver recovers data from Orthogonal Frequency Division Multiplexed (OFDM) symbols, the OFDM symbols including a plurality of sub-carrier signals. Some of the sub-carrier signals carrying data symbols and some of the sub-carrier signals carrying pilot symbols, the pilot symbols comprising scattered pilots symbols and continuous pilot symbols. The continuous pilot symbols are distributed across the sub-carrier signals in accordance with a continuous pilot symbol pattern and the scattered pilot symbols are distributed across the sub-carrier signals in accordance with a scattered pilot signal pattern. The receiver comprises a demodulator configured to detect a signal representing the OFDM symbols and to generate a sampled digital version of the OFDM symbols in the time domain. A Fourier transform processor is configured to receive the time domain digital version of the OFDM symbols and to form a frequency domain version of the OFDM symbols, from which the pilot symbol bearing sub-carriers and the data symbol bearing sub-carriers can be recovered. A detector is configured to recover the data symbols from the data bearing sub-carrier signals of the OFDM symbols and to recover the pilot symbols from the pilot bearing sub-carrier signals of the OFDM symbols in accordance with the scattered pilot symbol pattern and the continuous pilot symbol pattern. The scattered pilot symbol pattern is one of a plurality of scattered pilot symbol patterns and the continuous pilot pattern is independent of the scattered pilot symbol pattern. The detector comprises a memory configured to store a master continuous pilot pattern and a processor configured to detect the number of sub-carrier signals in the plurality of sub-carrier signals and to derive the continuous pilot pattern from a master pilot pattern based on the number of sub-carrier signals.

The provision of continuous pilot patterns that are independent of scattered pilot patterns means that fewer continuous pilot patterns have to be stored in memory when there is a plurality of scattered pilot patterns. Furthermore, the ability to derive continuous pilot patterns from a master pilot pattern dependent on the number of sub-carriers may allow fewer continuous plot patterns to be stored in memory when the number of sub-carriers varies from symbol to symbol.

In some examples the number of sub-carrier signals in the plurality of sub-carrier signals is one of a set of sub-carrier signal numbers and the master pilot symbol pattern is the pilot symbol pattern for the continuous pilot symbols for OFDM symbols which include the highest number of sub-carrier signals from the set of sub-carrier signal numbers.

The provision of a master pilot pattern which is for the highest order sub-carrier mode means that the pilot sub-carrier patterns for modes with fewer subcarriers can be derived without storing separate pilot patterns. This therefore may allow a single pilot pattern to be stored that covers all possible sub-carrier numbers, thus saving memory anywhere a continuous pilot pattern is required to be stored for each mode.

In some examples the set of sub-carrier numbers includes approximately 8 k, 16 k, and 32 k sub-carriers, the master pilot pattern being provided for the 32 k sub-carriers, and the continuous pilot pattern for the 8 k and 16 k sub-carriers being derived from the 32 k sub-carrier continuous pilot pattern.

Various further aspects and features of the present technique are defined in the appended claims and include a transmitter for transmitting OFDM symbols, a method for transmitting OFDM symbols and a method for receiving OFDM symbols.

BRIEF DESCRIPTION OF THE DRAWINGS

Embodiments of the present invention will be now be described by way of example only with reference to the accompanying drawings where like parts are provided with corresponding reference numerals:

FIG. 6 provides a table of continuous pilot symbol sub-carrier locations for an 8 k mode in accordance with an example of the present disclosure;

FIG. 10 provides a table of continuous pilot symbol sub-carrier locations for a 16 k mode in accordance with an example of the present disclosure;

FIG. 13 provides a table of continuous pilot symbol sub-carrier locations for a 32 k mode in accordance with an example of the present disclosure;

DESCRIPTION OF EXAMPLE EMBODIMENTS

Figure 1:
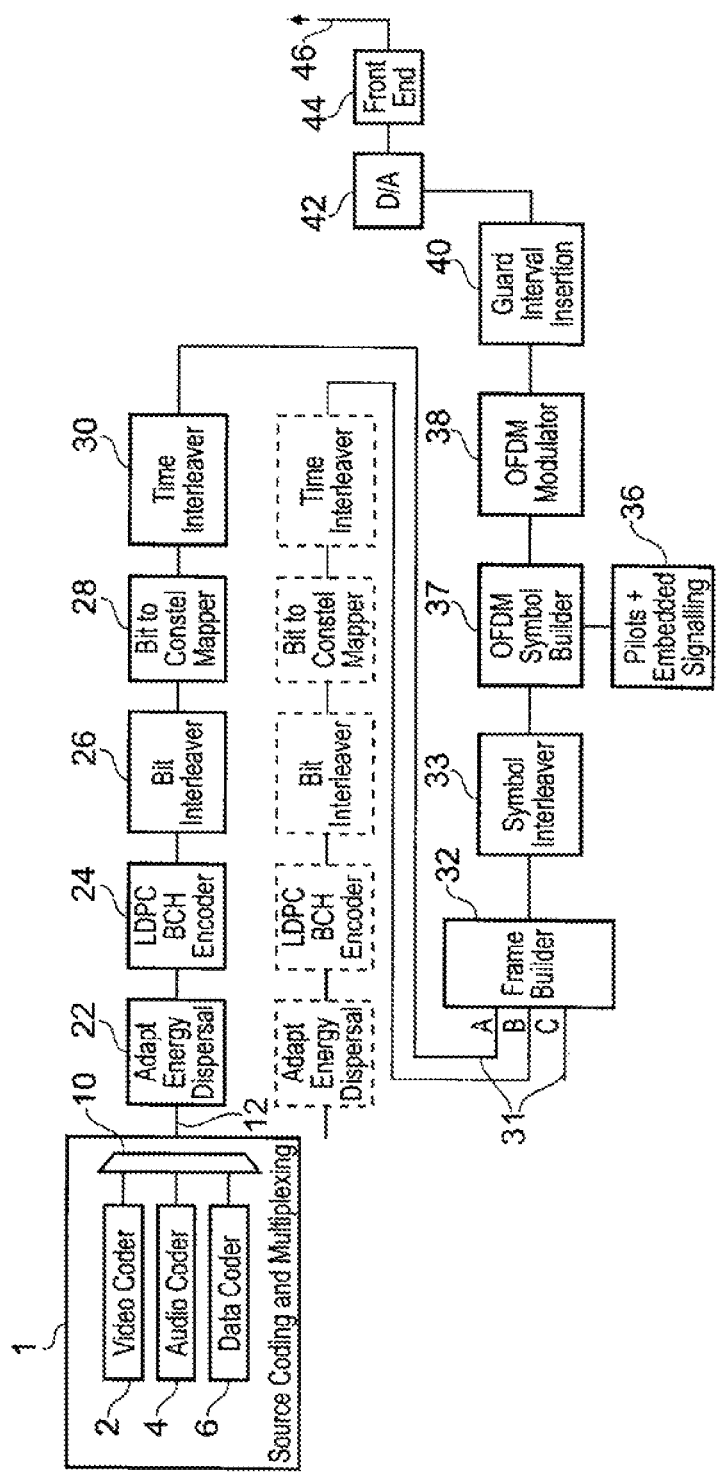
FIG. 1 provides a schematic diagram of an example OFDM transmitter.

FIG. 1 provides an example block diagram of an OFDM transmitter which may be used for example to transmit video images and audio signals in accordance with the proposed ATSC 3 standard or DVB-T, DVB-H, DVB-T2 or DVB-C2 standards. In FIG. 1 a program source generates data to be transmitted by the OFDM transmitter. A video coder 2, and audio coder 4 and a data coder 6 generate video, audio and other data to be transmitted which are fed to a program multiplexer 10. The output of the program multiplexer 10 forms a multiplexed stream with other information required to communicate the video, audio and other data. The multiplexer 10 provides a stream on a connecting channel 12. There may be many such multiplexed streams which are fed into different branches A, B etc. For simplicity, only branch A will be described.

As shown in FIG. 1, an OFDM transmitter 20 receives the stream at a multiplexer adaptation and energy dispersal block 22. The multiplexer adaptation and energy dispersal block 22 randomises the data and feeds the appropriate data to a forward error correction encoder 24 which performs error correction encoding of the stream. A bit interleaver 26 is provided to interleave the encoded data bits which for the example in a DVB-T2 system is the LDCP/BCH encoder output. The output from the bit interleaver 26 is fed to a bit into constellation mapper 28, which maps groups of bits onto a constellation point of a modulation scheme, which is to be used for conveying the encoded data bits. The outputs from the bit into constellation mapper 28 are constellation point labels that represent real and imaginary components. The constellation point labels represent data symbols formed from two or more bits depending on the modulation scheme used. These can be referred to as data cells. These data cells are passed through a time-interleaver 30 whose effect is to interleave data cells resulting from multiple LDPC code words.

The data cells are received by a frame builder 32, with data cells produced by branch B etc. in FIG. 1, via other channels 31. The frame builder 32 then forms many data cells into sequences to be conveyed on OFDM symbols, where an OFDM symbol comprises a number of data cells, each data cell being mapped onto one of a plurality of sub-carriers. The number of sub-carriers will depend on the mode of operation of the system, which may include one or more of 8 k, 16 k or 32 k, each of which provides a different number of sub-carriers and therefore fast Fourier transform (FFT) sizes.

The sequence of data cells to be carried in each OFDM symbol is then passed to the symbol interleaver 33. The OFDM symbol is then generated by an OFDM symbol builder block 37 which introduces pilot and synchronising signals generated by and fed from a pilot and embedded signal former 36 according to pilot symbol pattern(s). An OFDM modulator 38 then forms the OFDM symbol in the time domain which is fed to a guard insertion processor 40 for generating a guard interval between symbols, and then to a digital to analogue convertor 42 and finally to an RF amplifier within an RF front end 44 for eventual broadcast by the COFDM transmitter from an antenna 46.

Frame Format

Figure 2:
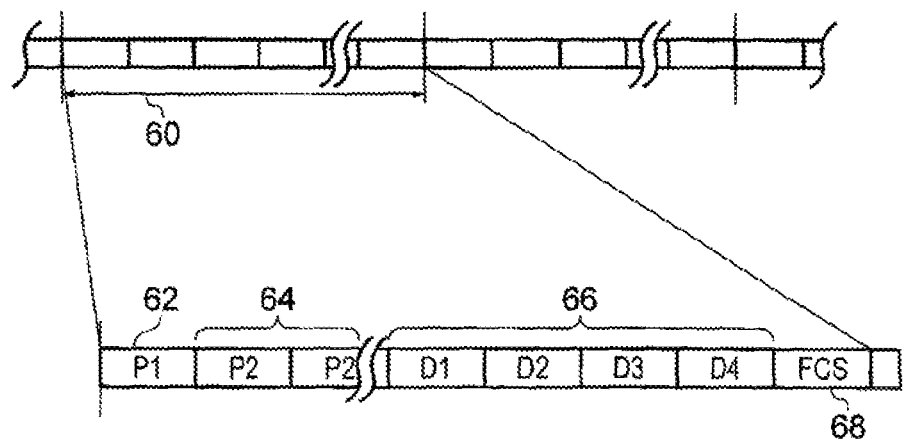
FIG. 2 provides an example OFDM super frame.

For the system of FIG. 1, the number of sub-carriers per OFDM symbol can vary depending upon the number of pilot and other reserved carriers. An example illustration of a "super frame" is shown in FIG. 2.

For example, in DVB-T2, unlike in DVB-T, the number of sub-carriers for carrying data is not fixed. Broadcasters can select one of the operating modes from 1 k, 2 k, 4 k, 8 k, 16 k, 32 k each providing a range of sub-carriers for data per OFDM symbol, the maximum available for each of these modes being 1024, 2048, 4096, 8192, 16384, 32768 respectively. In DVB-T2 a physical layer frame is composed of many OFDM symbols. Typically the frame starts with a preamble or P1 symbol as shown in FIG. 2, which provides signalling information relating to the configuration of the DVB-T2 deployment, including an indication of the mode. The P1 symbol is followed by one or more P2 OFDM symbols 64, which are then followed by a number of payload carrying OFDM symbols 66. The end of the physical layer frame is marked by a frame closing symbols (FCS) 68. For each operating mode, the number of sub-carriers may be different for each type of symbol. Furthermore, the number of sub-carriers may vary for each according to whether bandwidth extension is selected, whether tone reservation is enabled and according to which pilot sub-carrier pattern has been selected.

Receiver

Figure 3:
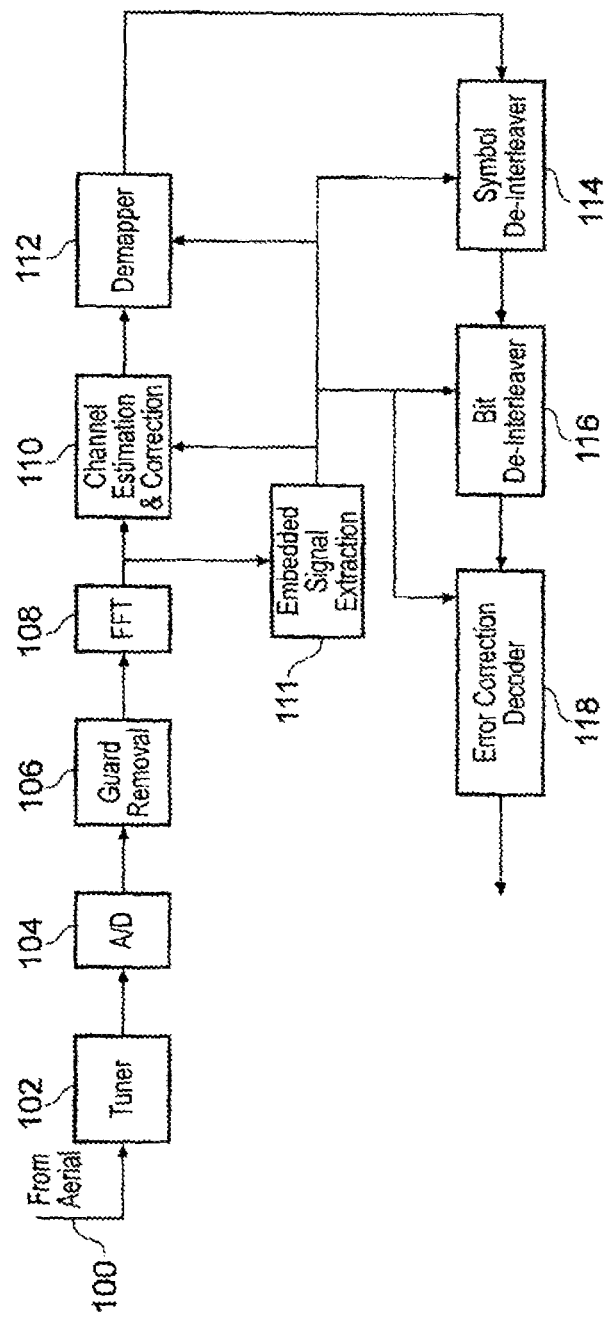
FIG. 3 provides a schematic diagram of an example OFDM receiver.

FIG. 3 provides an example illustration of an OFDM receiver which may be used to receive signals transmitted from the transmitter illustrated in FIG. 1. As shown in FIG. 3, an OFDM signal is received by an antenna 100 and detected by a tuner 102 and converted into digital form by an analogue-to-digital converter 104. A guard interval removal processor 106 removes the guard interval from a received OFDM symbol, before the payload data and pilot data is recovered from the OFDM symbol using a Fast Fourier Transform (FFT) processor 108 in combination with a channel estimator and corrector 110, an embedded-signalling decoding unit 111 and pilot symbol pattern(s). The demodulated data is recovered from a de-mapper 112 and fed to a symbol de-interleaver 114, which operates to effect a reverse mapping of the received data symbol to re-generate an output data stream with the data de-interleaved. Similarly, the bit de-interleaver 116 reverses the bit interleaving performed by the bit interleaver 26. The remaining parts of the OFDM receiver shown in FIG. 3 are provided to effect error correction decoding 118 to correct errors and recover an estimate of the source data.

Embodiments of the present technique provide a communication system which utilises OFDM to transmit data and reuses much of the system design and configuration parameters which have been adopted for the DVB-T2 standard. However the communication system is adapted to transmit OFDM symbols within channels of 6 MHz rather than the 8 MHz which is used for the DVB T2 standard and utilise 8 k, 16 k and 32 k modes. Accordingly, the present disclosure presents an adaptation of the parameters for an OFDM system for 6 MHz but rationalising where possible the parameters that were developed for the DVB T2 standard to simplify architecture and implementation of a communications system. In some embodiments the 8 k mode is an operating mode in which the number of active or useful subcarriers lies between 4097 and 8192, the 16 k mode is an operating mode in which the number of active or useful subcarriers lies between 8192 and 16384, and the 32 k mode is an operating mode in which the number of active useful subcarriers lies between 16385 and 32768.

In some embodiments, when referring to 6 MHz bandwidth herein, in practice the useful bandwidth is approximately 5.71 MHz or 5.70 MHz allowing for small guard bands and/or depending on the precise number of active sub-carriers used.

Pilot Symbols

In addition to signalling data and a payload data, OFDM frames and the cells they include may also comprise pilot symbols which have been inserted at the transmitter. These pilot symbols may for instance have been generated by the pilot and embedded signal former 36 and inserted by the symbol builder 37. Pilot symbols are transmitted with a known amplitude and phase and the sub-carriers upon which they are transmitted may be termed pilot sub-carriers. Pilot symbols may be required for a range of different purposes at the receiver, for example, channel estimation, synchronisation, coarse frequency offset estimation and fine frequency offset estimation. Due to the a priori knowledge of the pilot symbols' amplitude and phase, the channel impulse response may be estimated based on the received pilot symbols, with the estimated channel then being used for purposes such as equalisation.

In order for the receiver to receive the pilot symbols and differentiate the pilots signals from other signalling symbols and data symbols, the pilot symbols may be distributed across the subcarriers and symbols of an OFDM frame according to a sub-carrier pilot symbol pattern. Consequently, if the receiver has knowledge of pilot symbol pattern and is synchronised with the OFDM frame, it will be able to extract the received pilot symbols from the appropriate locations or sub-carriers in the OFDM symbols and frame.

The distribution of pilots with respect to OFDM sub-carriers may fall into two categories: continuous pilots and scattered pilots. Continuous pilots are formed from pilot symbols whose location relative to the sub-carriers does not change from symbol to symbol with the result that they are transmitted on a same sub-carrier each time. Scattered pilots broadly describe pilot symbols whose location changes from symbol to symbol, possibly according to some repeating pattern.

Figure 4:
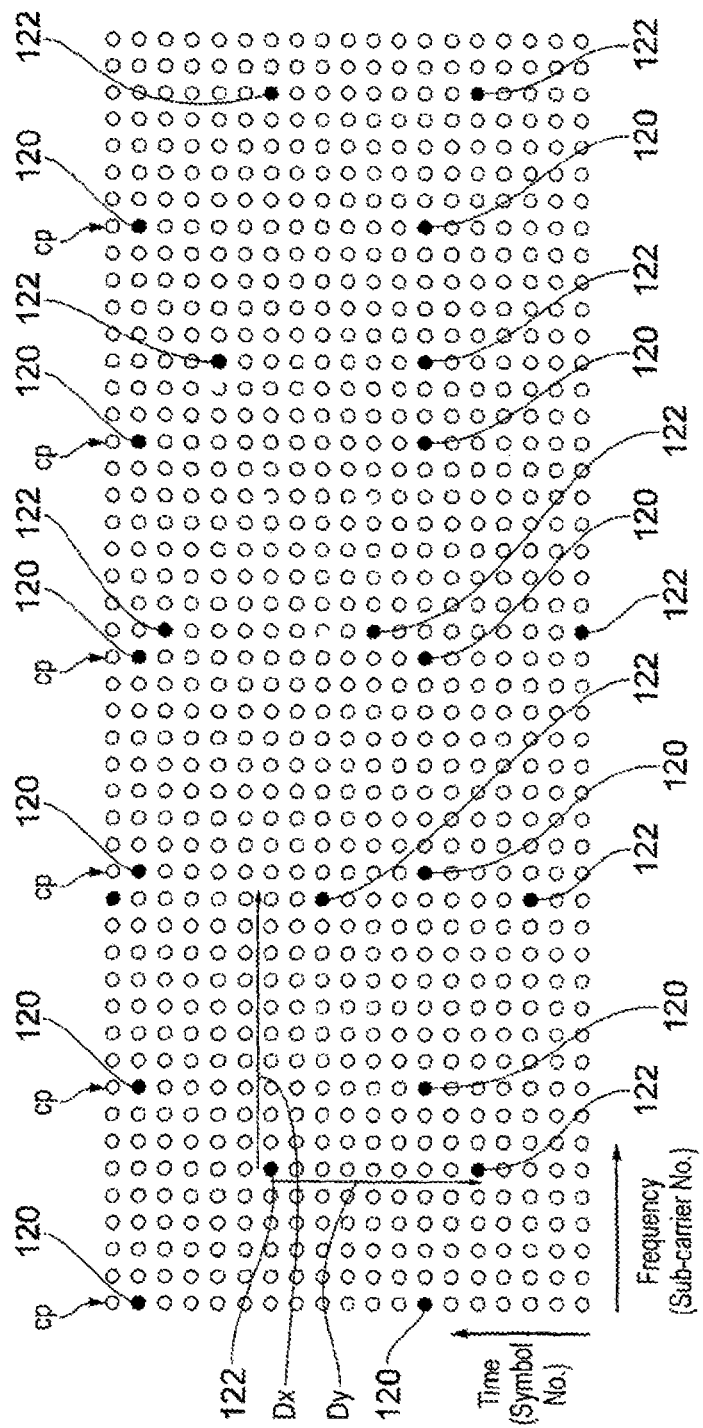
FIG. 4 provides a diagram of part of an example OFDM frame.

FIG. 4 illustrates a series of OFDM symbols where the circles represent OFDM cells and shaded circles represent pilot symbols. In FIG. 4 the horizontal direction represents frequency or the sub-carrier number, and the vertical direction represents time or the symbol number. Continuous pilot symbols 120 are located on the same subcarrier (CP) each time whereas scattered pilots 122 are located on different sub-carriers from symbol to symbol. The repetition of the scattered pilots can be represented by variables Dx and Dy. Dx represents a separation between scattered pilots in the frequency domain from one OFDM symbol to another, so that the scattered pilot symbols on a first OFDM symbol is displaced by a number of sub-carriers equal to Dx in the frequency domain on a subcarrier in the next OFDM symbol. Dy represents a parameter indicating a number of OFDM symbols before the same subcarrier is used again to carry a pilot symbol on the next occasion. For instance, in FIG. 4 the location of the scattered pilots symbols may be represented by Dy=8, and Dx=10. Scattered pilots are an efficient way of providing pilot symbols because channel estimates for sub-carriers and symbols in between scattered pilot symbols can be estimated by interpolation in both time and frequency from the known pilot symbols or channel estimates. Consequently, pilot symbols may not be required to be present on all sub carriers in order to obtain channel estimates for each sub-carrier and cell within an OFDM frame.

Pilot symbols occupy sub-carriers and cells which may otherwise be carrying data, therefore pilot symbols adversely affect the capacity of a system and it may be advantageous to minimise the number of pilot symbols. Consequently, a well-designed pilot pattern that enables channel estimates etc. to be obtained across the entire OFDM frame whilst using a small number of pilot symbols is desirable.

The scattered pilot pattern chosen for an OFDM signal may be dependent upon a number of factors, such as the rate of channel variation with respect to time and frequency. For instance, the density of the pilots must fulfil the sampling theorem in both time and frequency if accurate channel estimates are to be obtained i.e. the maximum channel impulses response length determines the pilot symbol repetition in the frequency direction, and the maximum Doppler frequency of the channels determines the pilot symbol repetition in the time domain. In some example OFDM systems the guard interval is determined by the length of the channel impulse response and therefore the pilot symbol repetition in the frequency direction may also be dependent upon the guard interval duration.

Figure 5:
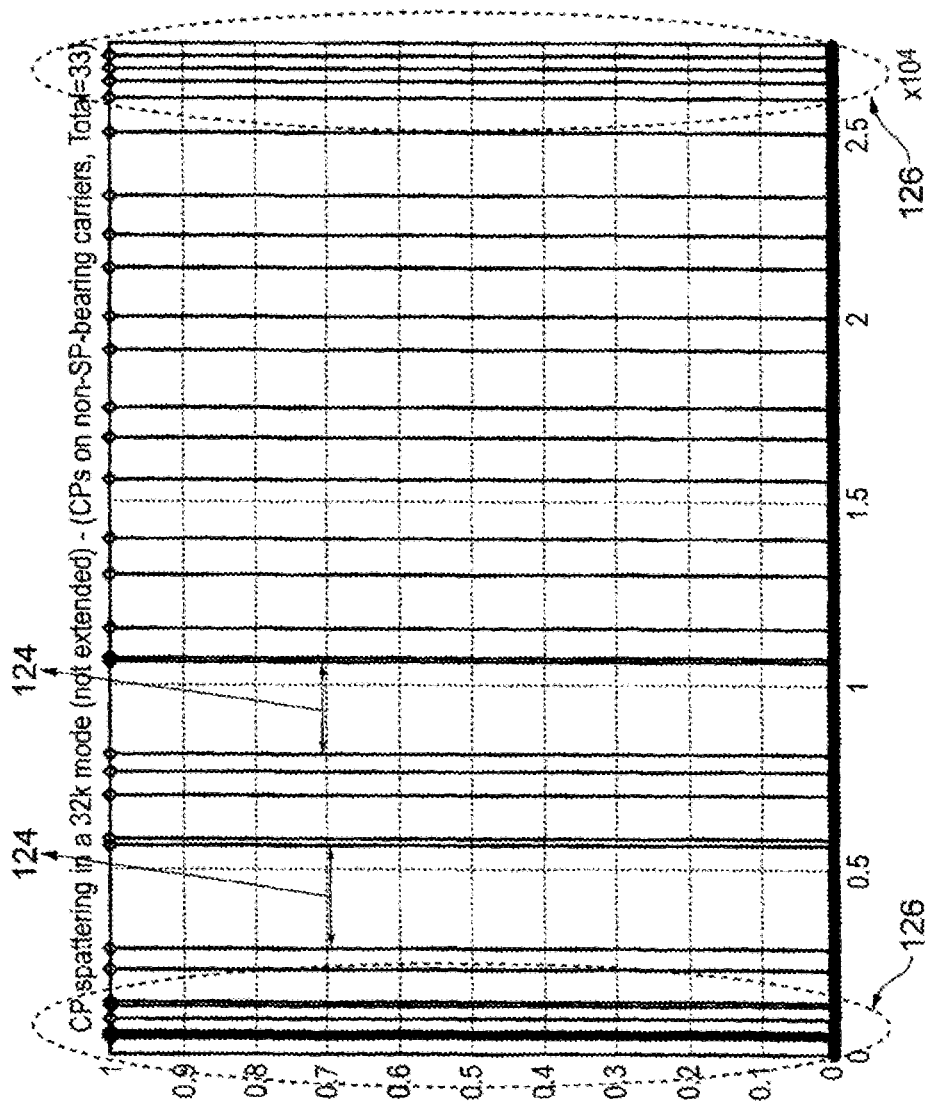
FIG. 5 provides a graph illustrating the distribution of continuous pilot locations in a DVB-T2 system that do not coincide with scattered pilot positions.

It may be beneficial if the location of continual pilot symbols and scattered pilot symbols do not overlap or coincide so that there is an approximately constant number of pilot symbols per frame and there are no significant "blind spots". In OFDM frames where there is large number of neighbouring cells which do not include a pilot symbol, this area may be referred to as a blind spot. It is generally desirable to avoid such situations because they may lead to reduced accuracy channel estimation and interpolation as well as a possible inability to detect and compensate for coloured noise such as analogue TV or other narrow band interference. FIG. 5 provides a graph of continuous pilot locations which do not coincide with scattered pilot positions in a DVB-T2 system and illustrates the aforementioned problems, where blind spots 124 are shown as regions where there is a lack of pilot symbols. Also shown in FIG. 5 are the edges of the frequency band 126 where measurements taken via pilot symbols on these regions may be subject to increased noise and attenuation and should therefore be avoided if possible.

A measure of the extent which continual pilot symbols and scattered pilots symbol coincide may be referred to as a utilisation ratio, and can be calculated using the formula below $$\text{Utilisation Ratio} = \frac{\text{Number of } CPnSP}{\text{Total Number of } CP} \times 100\%$$

where CPnSP represents the number of continual pilot symbols which do not coincide with scattered pilots sub-carriers during an OFDM frame. Consequently, due to the reasons given above, it may be beneficial to try and maximise the utilisation ratio. There are also a number of other factors which may have to be taken into account when determining the scattered pilot and continual pilot patterns, for instance, it may not be useful to have pilot symbols close to the outer sub-carriers of an OFDM signal because it is likely that these sub-carriers may be within the transition band of tuner filters and be subject to extra noise as mentioned above. It may also be beneficial to randomise the location of pilot symbols to some extent in order to ensure that interference is adequately modelled and reliable channel estimates obtained. Furthermore, due to the dependence of the scattered pilot patterns on factors such as the guard interval duration and Doppler spread, an OFDM system may have a plurality of scattered pilot patterns available to use, each specified by the repetition rates Dx and Dy.

Due to the possible variation of scattered pilot patterns, in order to maximise the utilisation ratio, minimise blind spots and avoid pilots symbols being located close to the outer sub-carriers, different continuous pilot patterns may be required for one or more of the scattered pilots patterns. For instance, in DVB-T2 in some modes there are eight scattered pilot patterns and eight corresponding continuous pilot patterns. In some OFDM systems there may be more than one pattern per mode and different patterns across different modes so that in total there may be a significant number of pilot patterns.

The pilot signal embedder 36 which embeds the pilot symbols at the transmitter and the pilot signal extractor 111 which extracts the pilot symbols at the receiver require knowledge of the pilot patterns. Consequently, it is likely that all the pilot patterns which may be used in a system will have to be stored in ROM at both the transmitter and the receiver, thus requiring a significant amount of memory if there are multiple modes and multiple pilot patterns per mode. This memory requirement is particularly relevant to the receiver in a broadcast system because there is likely to be a large number of receivers compared to transmitters and the cost of the receivers is likely to be lower than that of the transmitters. Consequently, reducing memory requirements will likely be beneficial, especially in the receiver side of a system.

In addition to memory requirements, utilising a large number of different scattered and continuous pilot patterns in a system also makes the system more complex because the transmitter has to select which pilot pattern is most appropriate for the current channel conditions and signal properties, and the receiver needs to identify the pilot pattern which is being used. The receiver may do this via the signalling information which specifies the pilot pattern(s) and mode of operation, or the receiver may detect the mode and pilot patterns via characteristics of the signal. However, both of these approaches become more complex and have larger overheads when more pilot patterns are available in a system. Therefore, it would be desirable to reduce the number of pilot patterns which are used in a system whilst maximising the utilisation ratio, avoiding blinds spots and minimising the number of pilots near to the outer sub-carriers.

In accordance with an example of the present technique, an OFDM system with a 6 MHz bandwidth and 8 k, 16 k, and 32 k modes has a single continuous pilot sub-carrier pattern for each mode, which is suitable for use with a plurality of different scattered pilot symbol patterns within each mode. In one example, there is a continuous pilot pattern which is suitable for use with one or more of the scattered pilot patterns given in Table 2 the below

TABLE 2

| Scattered Pilot Patterns | | |
| --- | --- | --- |
| Scattered Pilot Pattern | Dx | Dy |
| P4, 2 | 4 | 2 |
| P4, 4 | 4 | 4 |
| P8, 2 | 8 | 2 |
| P16, 2 | 16 | 2 |
| P32, 2 | 32 | 2 |

Figure 7:
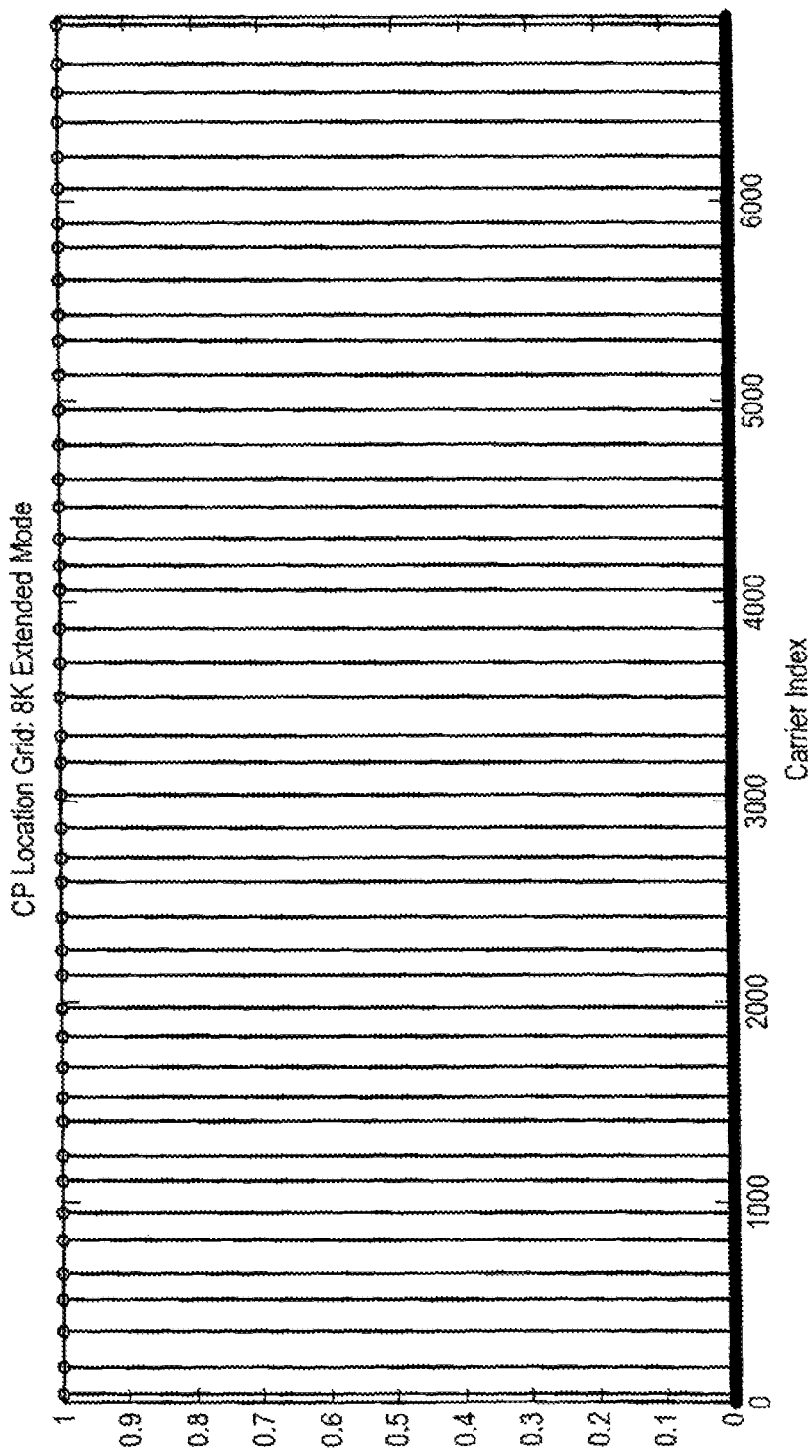
FIG. 7 provides an illustration of continuous pilot symbol sub-carrier locations for an 8 k mode in accordance with an example of the present disclosure.
Figure 8:
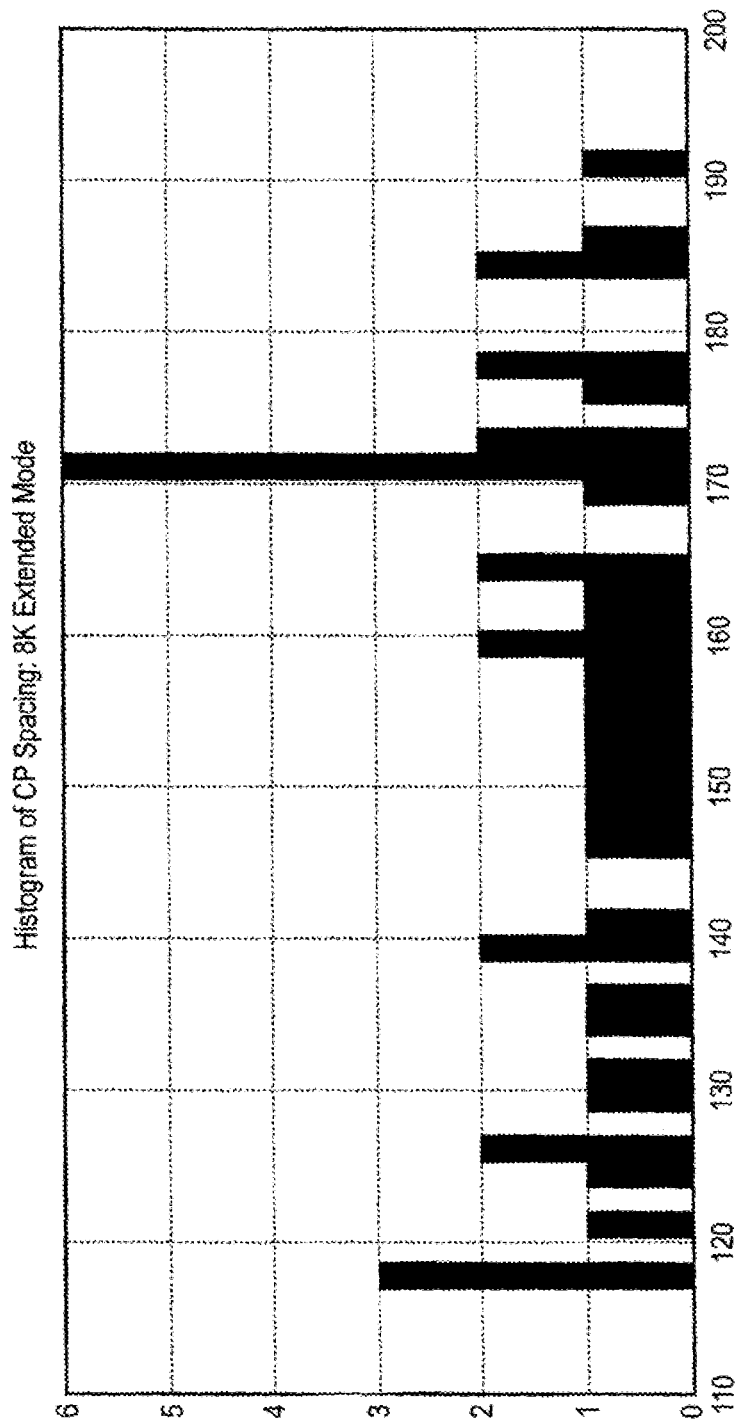
FIG. 8 provides a histogram of the spacing of continuous pilot symbol sub-carrier locations for an 8 k mode in accordance with an example of the present disclosure.
Figure 9:
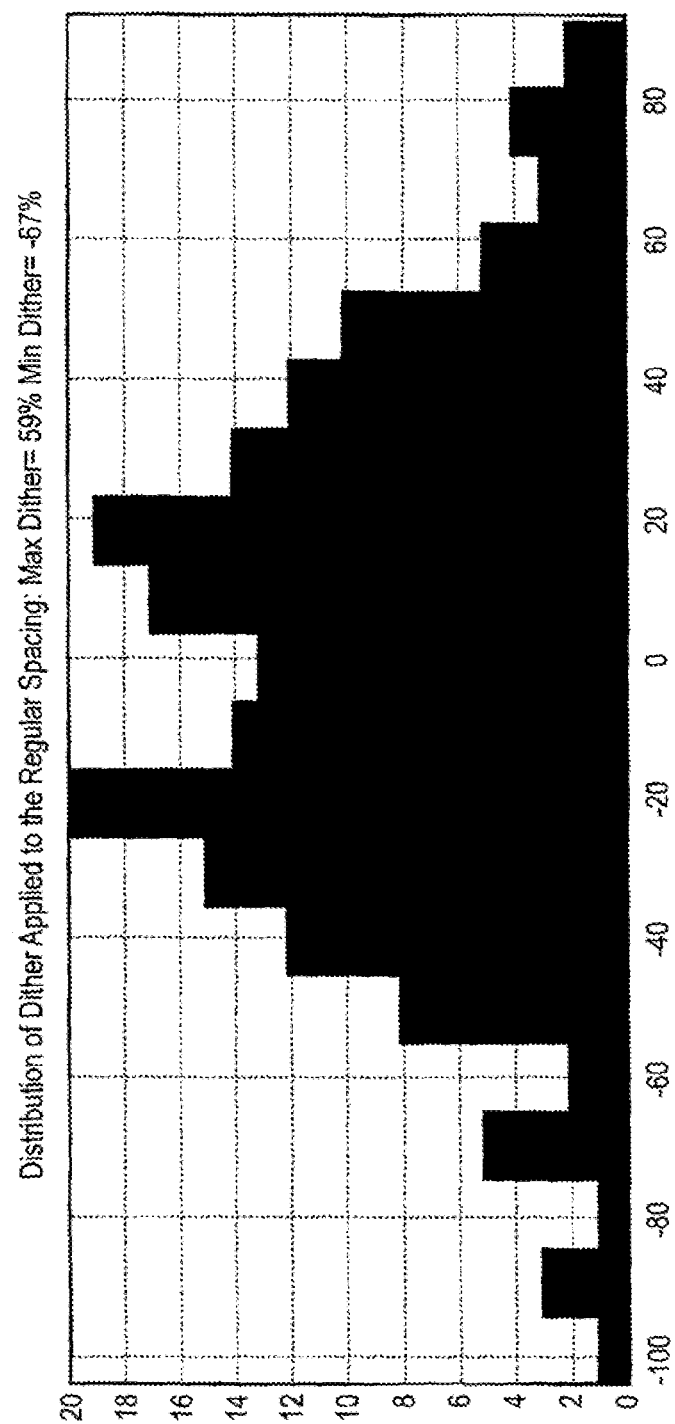
FIG. 9 provides a histogram of dither applied to the continuous pilot symbol sub-carrier locations in accordance with an example of the present disclosure.

In an 8 k mode (normal or extended) of an OFDM system that utilises the scattered pilots sequence given in Table 2 above, the distribution of the continuous pilots may be given by the table in FIG. 6. The same locations as given in FIG. 6 are also given by 41, 173, 357, 505, 645, 805, 941, 1098, 1225, 1397, 1514, 1669, 1822, 1961, 2119, 2245, 2423, 2587, 2709, 2861, 3026, 3189, 3318, 3510, 3683, 3861, 4045, 4163, 4297, 4457, 4598, 4769, 4942, 5113, 5289, 5413, 5585, 5755, 5873, 6045, 6207, 6379, 6525, 6675, 6862 in terms of sub-carrier locations in the extended bandwidth mode. For operation in normal 8 k mode the pilot pattern may be derived by discarding the final sub-carrier location. The location of the continuous pilot symbols relative to the sub-carriers given in FIG. 6 do not coincide with the location of the scattered pilots given in Table 2 above and therefore the continuous pilot pattern obtains a utilisation ratio of 100%. FIG. 7 graphically illustrates the location of the continuous pilots of FIG. 6 for the extended 8 k mode and shows that there is a substantially uniform distribution of continuous pilots across the subcarriers of the extended 8 k mode without any substantial blind spots. FIG. 8 provides a histogram of the continuous pilot symbol spacing with respect to sub-carriers. The histogram once again shows that there is a substantially consistent distribution of continuous pilot symbols across the sub-carriers, thus reinforcing the absence of blind spots. Although the distribution of pilot symbols across the sub-carriers is substantially uniform, their location has been randomised to some extent by the introduction of dither. FIG. 9 illustrates the dither which has been applied to the placement of the continuous pilot symbols in FIG. 6.

Figure 11:
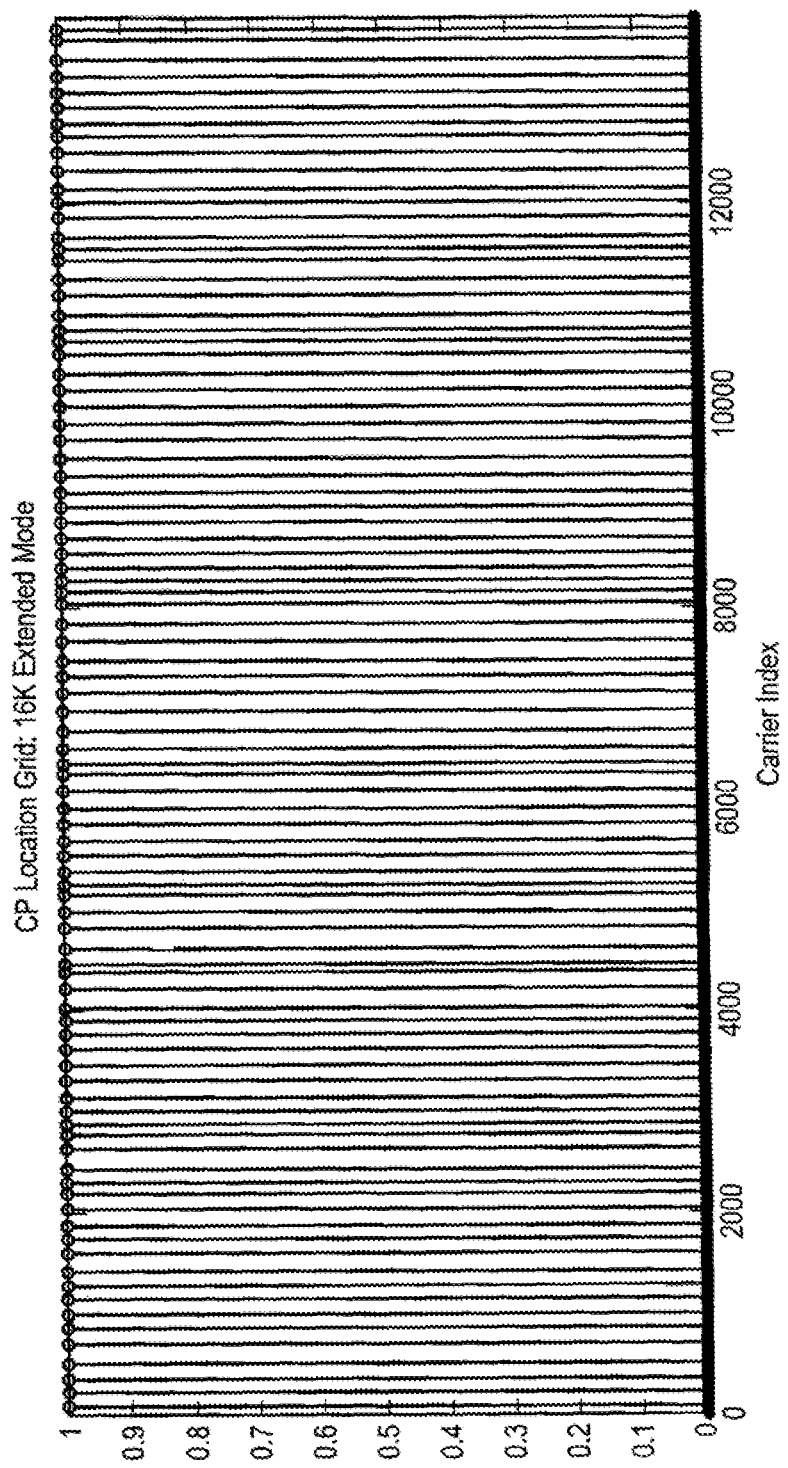
FIG. 11 provides an illustration of continuous pilot symbol sub-carrier locations for a 16 k mode in accordance with an example of the present disclosure.
Figure 12:
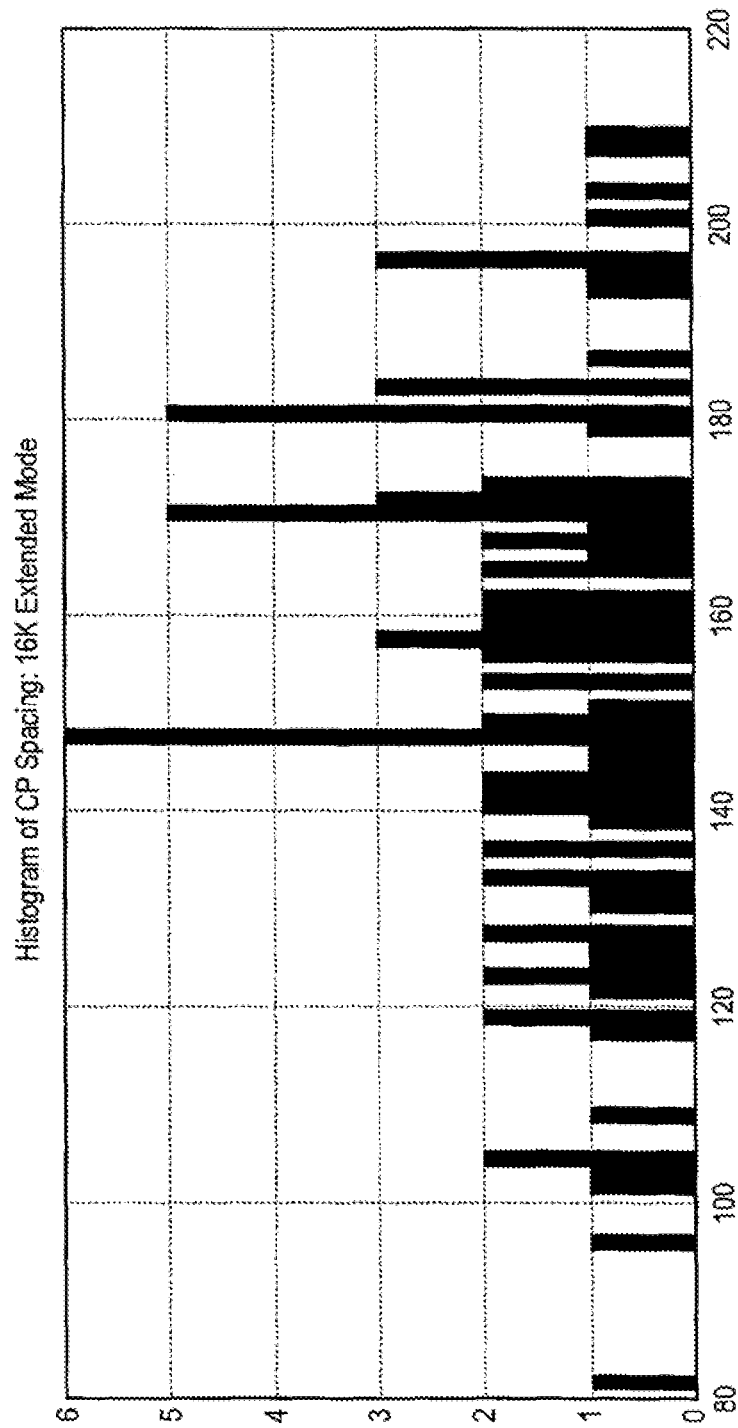
FIG. 12 provides a histogram of the spacing of continuous pilot symbol sub-carrier locations for a 16 k mode in accordance with an example of the present disclosure.

In a 16 k mode (normal or extended) of an OFDM system that utilises the scattered pilots sequence given in Table 2 above, the distribution of the continuous pilots may be given by the table in FIG. 10. The same locations as given in FIG. 10 are also given by 82, 243, 346, 517, 714, 861, 1010, 1157, 1290, 1429, 1610, 1753, 1881, 2061, 2197, 2301, 2450, 2647, 2794, 2899, 3027, 3159, 3338, 3497, 3645, 3793, 3923, 4059, 4239, 4409, 4490, 4647, 4847, 5013, 5175, 5277, 5419, 5577, 5723, 5895, 6051, 6222, 6378, 6497, 6637, 6818, 7021, 7201, 7366, 7525, 7721, 7895, 8090, 8199, 8325, 8449, 8593, 8743, 8915, 9055, 9197, 9367, 9539, 9723, 9885, 10058, 10226, 10391, 10578, 10703, 10825, 10959, 11169, 11326, 11510, 11629, 11747, 11941, 12089, 12243, 12414, 12598, 12758, 12881, 13050, 13195, 13349, 13517, 13725, 13821 in terms of sub-carrier locations in the extended bandwidth mode. For operation in normal 16 k mode the pilot pattern may be derived by discarding the final two sub-carrier locations. The location of the continuous pilot symbols relative to the sub-carriers given in FIG. 10 do not coincide with the location of the scattered pilots given in Table 2 above and therefore the continuous pilot pattern obtains a utilisation ratio of 100%. FIG. 11 graphically illustrates the location of the continuous pilots of FIG. 10 for the extended 16 k mode and shows that there is a substantially uniform distribution of continuous pilots across the subcarriers of the extended 16 k mode without any substantial blind spots. FIG. 12 provides a histogram of the continuous pilot symbol spacing with respect to sub-carriers. The histogram once again shows that there is a substantially consistent distribution of continuous pilot symbols across the sub-carriers, thus reinforcing the absence of blind spots. As for the 8 k mode, although the distribution of pilot symbols across the sub-carriers is substantially uniform, their location has been randomised to some extent by the introduction of dither. The same dither as applied to the 8 k continuous pilot symbol placement has also been applied to the 16 k continuous pilot symbol placement and therefore FIG. 9 illustrates the dither which has been applied the placement of the continuous pilot symbols in FIG. 10.

Figure 14:
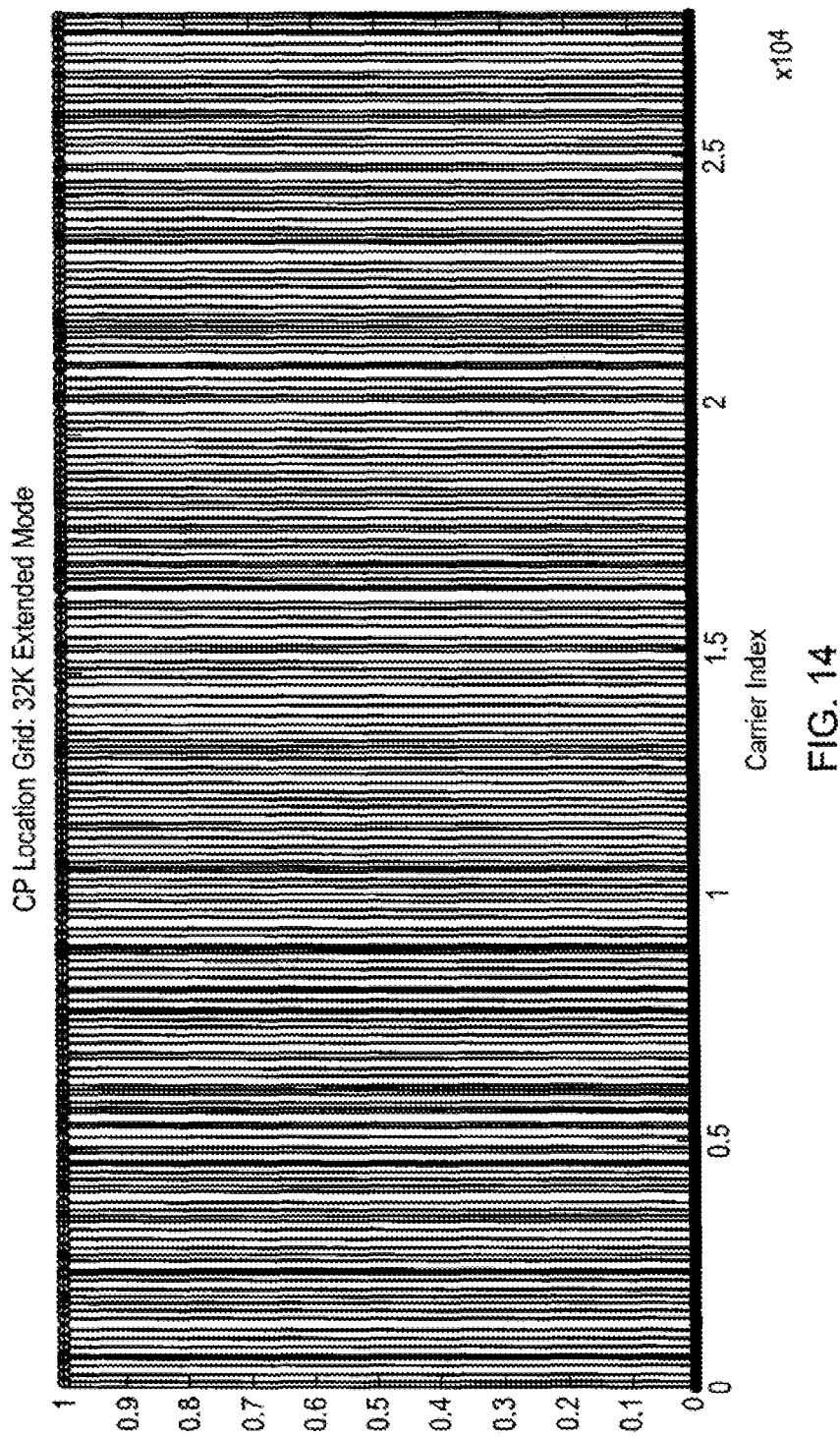
FIG. 14 provides an illustration of continuous pilot symbol sub-carrier locations for a 32 k mode in accordance with an example of the present disclosure.
Figure 15:
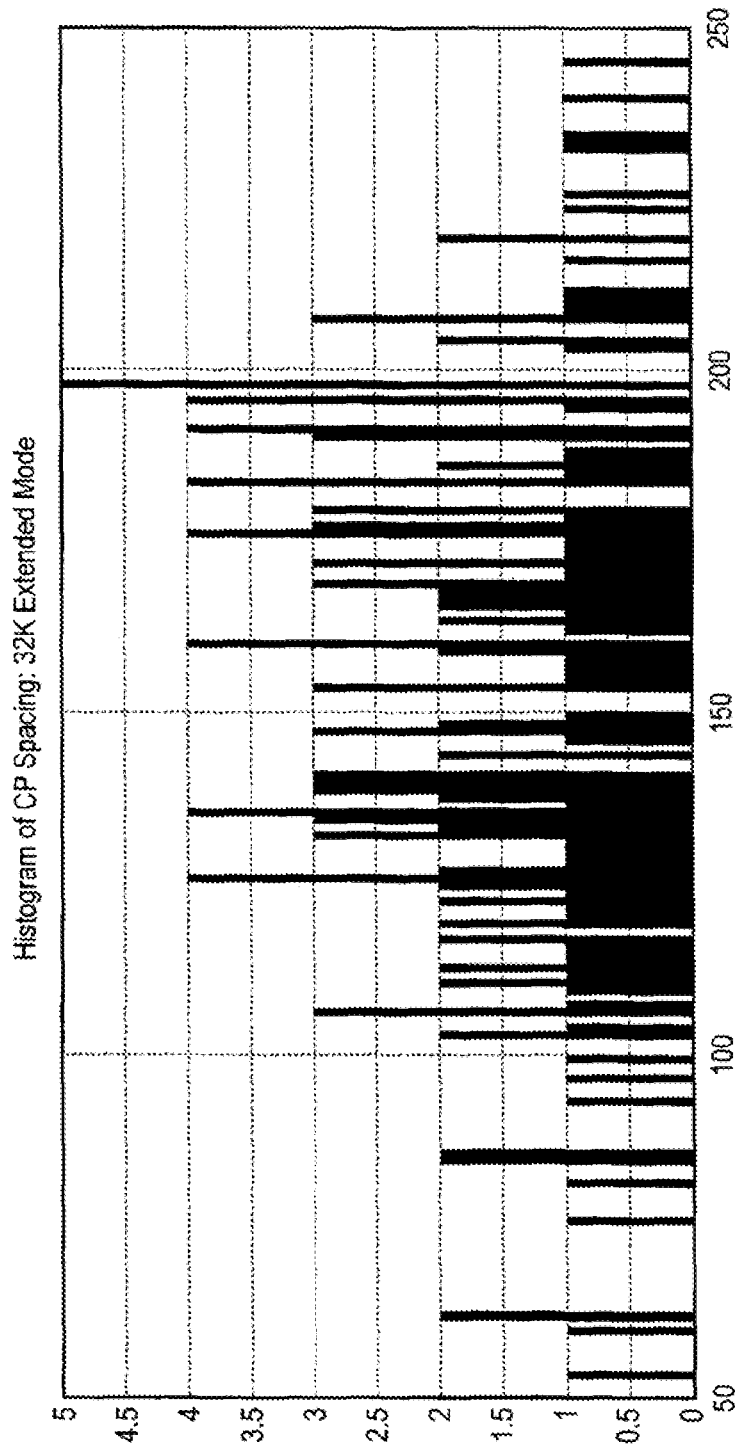
FIG. 15 provides a histogram of the spacing of continuous pilot symbol sub-carrier locations for a 32 k mode in accordance with an example of the present disclosure.

In a 32 k mode of an OFDM system that utilises the scattered pilots sequence given in Table 2 above, the distribution of the continuous pilots may for example be given by the table in FIG. 13. The same locations as given in FIG. 13 are also given by 163, 290, 486, 605, 691, 858, 1033, 1187, 1427, 1582, 1721, 1881, 2019, 2217, 2314, 2425, 2579, 2709, 2857, 3009, 3219, 3399, 3506, 3621, 3762, 3997, 4122, 4257, 4393, 4539, 4601, 4786, 4899, 5095, 5293, 5378, 5587, 5693, 5797, 5937, 6054, 6139, 6317, 6501, 6675, 6807, 6994, 7163, 7289, 7467, 7586, 7689, 7845, 8011, 8117, 8337, 8477, 8665, 8817, 8893, 8979, 9177, 9293, 9539, 9693, 9885, 10026, 10151, 10349, 10471, 10553, 10646, 10837, 10977, 11153, 11325, 11445, 11605, 11789, 11939, 12102, 12253, 12443, 12557, 12755, 12866, 12993, 13150, 13273, 13445, 13635, 13846, 14041, 14225, 14402, 14571, 14731, 14917, 15050, 15209, 15442, 15622, 15790, 15953, 16179, 16239, 16397, 16533, 16650, 16750, 16897, 17045, 17186, 17351, 17485, 17637, 17829, 17939, 18109, 18246, 18393, 18566, 18733, 18901, 19077, 19253, 19445, 19589, 19769, 19989, 20115, 20275, 20451, 20675, 20781, 20989, 21155, 21279, 21405, 21537, 21650, 21789, 21917, 22133, 22338, 22489, 22651, 22823, 23019, 23205, 23258, 23361, 23493, 23685, 23881, 24007, 24178, 24317, 24486, 24689, 24827, 25061, 25195, 25331, 25515, 25649, 25761, 25894, 26099, 26246, 26390, 26569, 26698, 26910, 27033, 27241, 27449, 27511, 27642, 27801 in terms of sub-carrier locations in the extended bandwidth mode. For operation in normal 32 k mode the pilot pattern may be derived by discarding the final four sub-carrier locations. The location of the continuous pilot symbols relative to the sub-carriers given in FIG. 14 do not coincide with the location of the scattered pilots given in Table 2 above and therefore the continuous pilot pattern obtains a utilisation ratio of 100%. FIG. 14 graphically illustrates the location of the continuous pilots of FIG. 13 for the extended 32 k mode and shows that there is a substantially uniform distribution of continuous pilots across the subcarriers of the extended 8 k mode without any substantial blind spots. FIG. 15 provides a histogram of the continuous pilot symbol spacing with respect to sub-carriers. The histogram once again shows that there is a substantially consistent distribution of continuous pilot symbols across the sub-carriers, thus reinforcing the absence of blind spots. As for the 8 k and 16 k modes, although the distribution of pilot symbols across the sub-carriers is substantially uniform, their location has been randomised to some extent by the introduction of dither. The same dither as applied to the 8 k and 16 k continuous pilot symbol placement has also been applied to the 32 k continuous pilot symbol placement and therefore FIG. 9 illustrates the dither which has been applied the placement of the continuous pilot symbols in FIG. 13.

As previously mentioned, the proposed continuous pilot patterns described above may also achieve substantially a 100% utilisation ratio, however, they also achieve a capacity loss which is approximately 0.65% in a system such as a proposed ATSC 3 system as previously described.

The continuous pilot patterns specified above may provide advantages over existing continuous pilot patterns because only a single continuous pilot pattern is required to operate with all five of the scattered pilots patterns specified in Table 2. Furthermore, these pilot patterns also reduce the number of blind spots in comparison to continuous pilot patterns such as those specified in DVB-T2. Since only one continuous pilot pattern is required to be stored at both the transmitter and the receiver compared to five if conventional continuous pilot patterns were used, memory requirements have been reduced by approximately 80%. However, memory for multiple continuous pilot patterns may still be required when there is more than one mode of operation e.g. 8 k, 16 k, 32 k, and both normal and extended modes are available. Consequently, in a system such as a proposed ATSC 3 system where there are three modes, it is likely that three continuous pilot patterns are still required to be stored.

In accordance with another example of the present technique, the continuous pilots patterns illustrated in FIGS. 6, 10, and 13 are related such that the continuous pilot patterns of the 8 k and the 16 k modes are derivable from the 32 k mode continuous pilot symbol pattern. This therefore allows a transmitter and a receiver to store only a single master continuous pilot pattern for the highest order mode then derive the continuous pilot patterns for lower order modes when they are required.

For instance, at the transmitter the pilot and embedded signal former 36 may comprise a processor which is operable to detect or receive data which conveys the operating mode of the OFDM system and then derive the appropriate continuous pilot pattern from a master pilot pattern based on the number of sub-carriers, where the master pilot pattern is stored in a memory at the pilot and embedded signal former 36. In the case of the continuous pilot patterns discussed above, the master continuous pilot pattern would be the 32 k pilot pattern and the 16 k continuous pilot pattern and the 8 k continuous pilot pattern would be derived from the 32 k pilot pattern by the processor according to the following equations below where the master pilot pattern is given by the following sub-carrier locations for the extended bandwidth mode 163, 290, 486, 605, 691, 858, 1033, 1187, 1427, 1582, 1721, 1881, 2019, 2217, 2314, 2425, 2579, 2709, 2857, 3009, 3219, 3399, 3506, 3621, 3762, 3997, 4122, 4257, 4393, 4539, 4601, 4786, 4899, 5095, 5293, 5378, 5587, 5693, 5797, 5937, 6054, 6139, 6317, 6501, 6675, 6807, 6994, 7163, 7289, 7467, 7586, 7689, 7845, 8011, 8117, 8337, 8477, 8665, 8817, 8893, 8979, 9177, 9293, 9539, 9693, 9885, 10026, 10151, 10349, 10471, 10553, 10646, 10837, 10977, 11153, 11325, 11445, 11605, 11789, 11939, 12102, 12253, 12443, 12557, 12755, 12866, 12993, 13150, 13273, 13445, 13635, 13846, 14041, 14225, 14402, 14571, 14731, 14917, 15050, 15209, 15442, 15622, 15790, 15953, 16179, 16239, 16397, 16533, 16650, 16750, 16897, 17045, 17186, 17351, 17485, 17637, 17829, 17939, 18109, 18246, 18393, 18566, 18733, 18901, 19077, 19253, 19445, 19589, 19769, 19989, 20115, 20275, 20451, 20675, 20781, 20989, 21155, 21279, 21405, 21537, 21650, 21789, 21917, 22133, 22338, 22489, 22651, 22823, 23019, 23205, 23258, 23361, 23493, 23685, 23881, 240007, 24178, 24317, 24486, 24689, 24827, 25061, 25195, 25331, 25515, 25649, 25761, 25894, 26099, 26246, 26390, 26569, 26698, 26910, 27033, 27241, 27449, 27511, 27642, 27801.

In order to derive the 16 k continuous pilot locations from the 32 k pilot positions given in FIG. 13 and above, every other 32 k continuous pilot position is taken, the position divided by two and the result rounded up. In terms of a computer implementable equation, this is given by CP_16K_pos=round(CP_32K_pos(1:2: last_32k_cp_pos)/2).

In order to derive the 8 k continuous pilot locations from the 32 k pilot positions given in FIG. 13 every four of the 32 k continuous pilot positions is taken, the taken position divided by four and the result rounded up. In terms of a computer implementable equation, this is given by CP_8K_pos=round(CP_32K_pos(1:4: last_32k_cp_pos)/4).

Using the equations above it is possible that the 8 k, 16 k and 32 k continuous pilot patterns may be derived from a single master set and therefore an OFDM system is effectively able to operate with a single continuous pilot pattern across all modes and all scattered pilot patterns. This may therefore simplify the operation of an OFDM system in terms of memory requirements but also the processing required because it is no longer necessary to switch between independent continuous pilot patterns which are unrelated.

Although in the preceding paragraphs the derivation of the continuous pilot patterns takes place at the transmitter, a similar process may also be performed at the receiver. For instance, the embedded signal decoding unit 111 may also comprises a processor which is substantially similar the processor described with reference to the pilot and embedded signal former 36. The processor would be operable to detect or receive data which conveys the operating mode of the OFDM system i.e. number of sub-carriers per OFDM symbol, and then derive the appropriate continuous pilot pattern from a master pilot pattern as previously described.

Due to the computational simplicity of the derivation processes described above, a decrease in ROM memory requirements i.e. the memory required to store the 8 k and 16 k continuous pilot patterns, may be achieved with only a small increase computational complexity. In some examples in accordance with the present technique, the derivation in the transmitter and the receiver may be performed by existing computational elements within the pilot related elements and therefore no additional components would be required in these cases.

In other examples in accordance with the present technique, the continuous pilot patterns for 8 k, 16 k and 32 k modes may be used in an OFDM system, such as an ATSC 3.0 system for example, in order to exploit the intrinsic advantages of the continuous pilot symbol patterns. For instance, the advantages relating to the regular distribution of the pilot locations and the reduction in pilot locations near the outer sub-carriers can be achieved by one of the continuous pilot sub-carrier patterns with the following indices: 41, 173, 357, 505, 645, 805, 941, 1098, 1225, 1397, 1514, 1669, 1822, 1961, 2119, 2245, 2423, 2587, 2709, 2861, 3026, 3189, 3318, 3510, 3683, 3861, 4045, 4163, 4297, 4457, 4598, 4769, 4942, 5113, 5289, 5413, 5585, 5755, 5873, 6045, 6207, 6379, 6525, 6675, (6862)
for the 8 k mode;
82, 243, 346, 517, 714, 861, 1010, 1157, 1290, 1429, 1610, 1753, 1881, 2061, 2197, 2301, 2450, 2647, 2794, 2899, 3027, 3159, 3338, 3497, 3645, 3793, 3923, 4059, 4239, 4409, 4490, 4647, 4847, 5013, 5175, 5277, 5419, 5577, 5723, 5895, 6051, 6222, 6378, 6497, 6637, 6818, 7021, 7201, 7366, 7525, 7721, 7895, 8090, 8199, 8325, 8449, 8593, 8743, 8915, 9055, 9197, 9367, 9539, 9723, 9885, 10058, 10226, 10391, 10578, 10703, 10825, 10959, 11169, 11326, 11510, 11629, 11747, 11941, 12089, 12243, 12414, 12598, 12758, 12881, 13050, 13195, 13349, 13517, (13725, 13821)
for the 16 k mode; and
163, 290, 486, 605, 691, 858, 1033, 1187, 1427, 1582, 1721, 1881, 2019, 2217, 2314, 2425, 2579, 2709, 2857, 3009, 3219, 3399, 3506, 3621, 3762, 3997, 4122, 4257, 4393, 4539, 4601, 4786, 4899, 5095, 5293, 5378, 5587, 5693, 5797, 5937, 6054, 6139, 6317, 6501, 6675, 6807, 6994, 7163, 7289, 7467, 7586, 7689, 7845, 8011, 8117, 8337, 8477, 8665, 8817, 8893, 8979, 9177, 9293, 9539, 9693, 9885, 10026, 10151, 10349, 10471, 10553, 10646, 10837, 10977, 11153, 11325, 11445, 11605, 11789, 11939, 12102, 12253, 12443, 12557, 12755, 12866, 12993, 13150, 13273, 13445,
13635, 13846, 14041, 14225, 14402, 14571, 14731, 14917, 15050, 15209, 15442, 15622, 15790, 15953, 16179, 16239, 16397, 16533, 16650, 16750, 16897, 17045, 17186, 17351, 17485, 17637, 17829, 17939, 18109, 18246, 18393, 18566, 18733, 18901, 19077, 19253, 19445, 19589, 19769, 19989, 20115, 20275, 20451, 20675, 20781, 20989, 21155, 21279, 21405, 21537, 21650, 21789, 21917, 22133, 22338, 22489, 22651, 22823, 23019, 23205, 23258, 23361, 23493, 23685, 23881, 24007, 24178, 24317, 24486, 24689, 24827, 25061, 25195, 25331, 25515, 25649, 25761, 25894, 26099, 26246, 26390, 26569, 26698, 26910, 27033, 27241, (27449, 27511, 27642, 27801) for the 32 k mode, where the values in brackets relate to the extended bandwidth modes.

In some embodiments, in the proposed ATSC3.0 frame structure, OFDM symbols in different physical layer frames may have different subcarrier spacing. Frequency domain frame synchronization in preamble detection is thus not readily possible. The preamble symbol (as generated by an $L_1$ signaling unit) must therefore be detected in the time domain. It is only after the preamble is decoded and its signaling payload interpreted that frequency domain processing of the frame can proceed. The new preamble fulfills all specific requirements:

Synchronization capabilities:
Offset correction capabilities;
Robustness of signaling;
Protection against interference.

In some embodiments, the same preamble is used for all frame types. It consists of a regular 8 k symbol with an extended guard interval GI (fractional length 57/128). This GI is chosen to map to the longest possible guard interval for a 32 k FFT size, i.e. 57/512). In some embodiments ISI avoidance for all frame types is therefore guaranteed.

In some embodiments, for the standard bandwidth (i.e. 6 MHz), the preamble symbol allocates 6912 subcarriers and contains 45 frequency offset estimation pilots at the same locations as the continual pilots of a payload symbol. In some embodiments no other pilots are foreseen. The 6867 payload carriers use BPSK modulation for L1 signaling.

In some embodiments, the preamble symbol uses an overlaid time domain pilot signal (SigSeq). This requires good ACF (auto correlation function) properties that allow for accurate frame synchronization and channel impulse response (CIR) estimation. The full-band Channel Transfer Function estimation at the receiver is accordingly calculated from the CIR.

Summary of Operation

Figure 16:
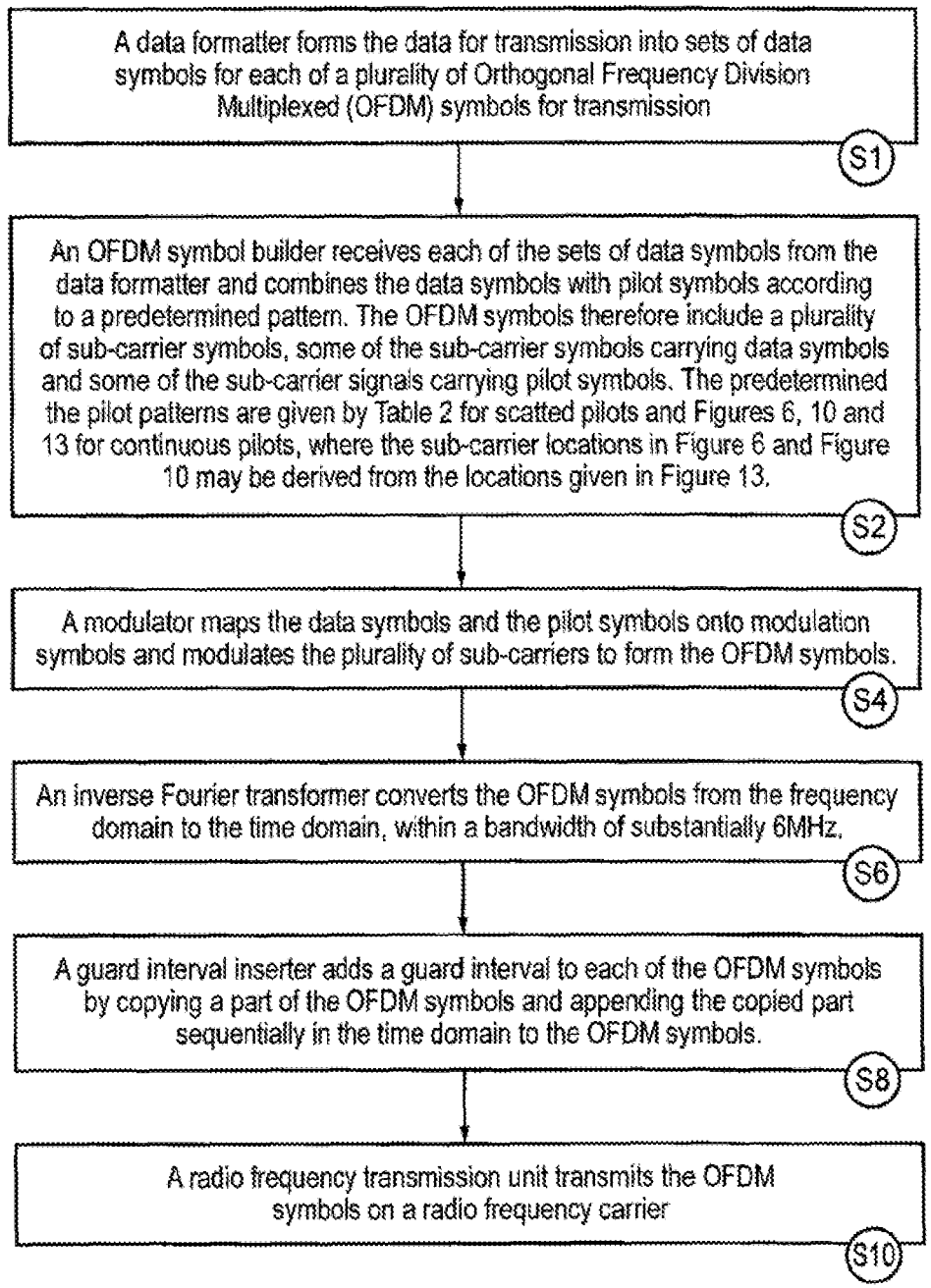
FIG. 16 provides a flow diagram of the operation of a transmitter in accordance with an example of the present disclosure.
Figure 17:
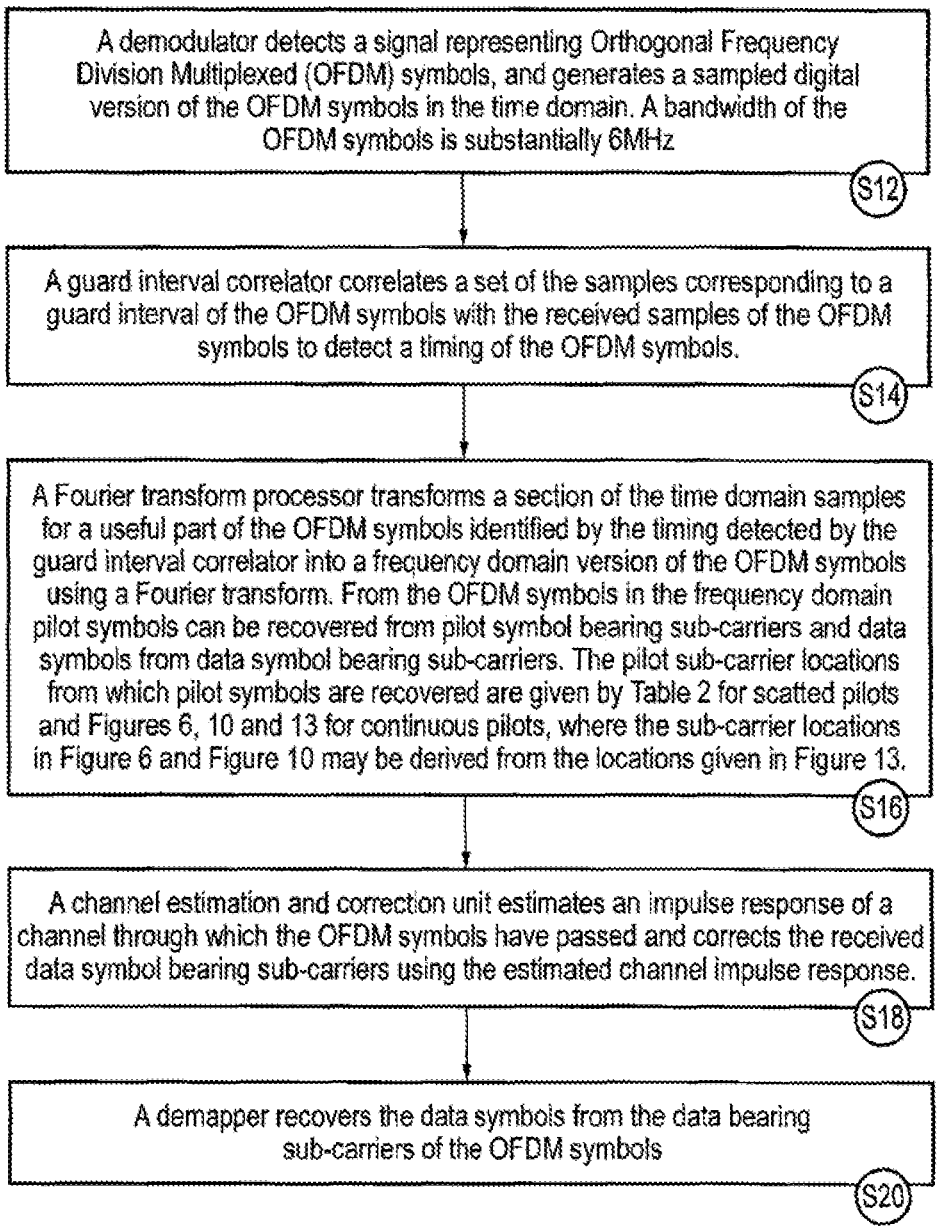
FIG. 17 provides a flow diagram of the operation of a receiver in accordance with an example of the present disclosure.

An example flow diagram illustrating the operation of a transmitter according to the present technique is shown in FIG. 16, an operation of a receiver to detect and recover data from a received OFDM symbol is provided in FIG. 17. The process steps illustrated in FIG. 15 are summarised as follows:

S1: As a first step to transmitting data using OFDM symbols a data formatter receives the data for transmission and forms the data into sets of data symbols for each of the OFDM symbols for transmission. Thus the data symbols are formed into the sets each have a number of data symbols corresponding to an amount of data which can be carried by an OFDM symbol.

S2: An OFDM symbol builder then receives each of the sets of data symbols from the data formatter and combines the data symbols with pilot symbols according to predetermined scattered and continuous pilot patterns. In accordance with the present technique, the pilot patterns are given by Table 2 for scatted pilots and FIGS. 6, 10, and 13 for continuous pilots, where the sub-carrier locations in FIG. 6 and FIG. 10 may be derived from the locations given in FIG. 13. The predetermined pattern sets out the subcarriers of the OFDM symbol which are to carry the pilot symbols. The remaining subcarriers of the OFDM symbol carry the data symbols. The OFDM symbols therefore each include a plurality of subcarrier symbols, some of the subcarrier symbols carrying data symbols and some of the subcarrier symbols carrying pilot symbols.

S4: A modulator maps the data symbols and the pilot symbols onto modulation symbols in accordance with the value of the data symbols and the pilot symbols. With the modulation symbols each of the subcarriers is then modulated to form the OFDM symbols in the frequency domain.

S6: An inverse Fourier transformer then converts the OFDM symbols in the frequency domain into the time domain within a bandwidth of the communication system which is 6 MHz or approximately 6 MHz.

S8: A guard interval inserter adds a guard interval to each of the time domain OFDM symbols by copying a part of the OFDM symbols which is a useful part containing data symbols or pilot symbols and appending the copied part sequentially in the time domain to the OFDM symbols. The part which is copied has a length which corresponds to a guard interval which is a predetermined guard interval duration.

S10: A radio frequency transmission unit then modulates a radio frequency carrier with the time domain OFDM symbols and transmits the OFDM symbols via an antenna of the transmitter.

The operation of a receiver to detect and recover data from the OFDM symbols transmitted by the method of transmission is presented in FIG. 17 which are summarised as follows:

S12: A demodulator receives a signal from an antenna and a radio frequency down converter and detects a signal representing the OFDM symbols. The demodulator generates a sampled digital version of the OFDM symbols in the time domain. A bandwidth of the OFDM symbols in the frequency domain in accordance with the present technique is substantially 6 MHz, that is approximately 6 MHz.

S14: A guard interval correlator correlates the set of samples corresponding to the guard interval of the OFDM symbols to detect a timing of a useful part of the OFDM symbols. A section of the received signal samples corresponding to the guard interval are copied and stored and then correlated with respect to the same received signal samples in order to detect a correlation peak identifying where the repeated guard intervals are present in the useful part of the OFDM symbols. S16: A Fourier transform processor then transforms a section of the time domain samples of the received signal for a useful part of the OFDM symbols identified by the timing detected by the guard interval correlator into the frequency domain using a Fourier transform. From the OFDM symbols in the frequency domain the pilot symbols can be recovered from the pilot symbol bearing subcarriers and data symbols can be recovered from data bearing subcarriers. In accordance with the present technique, the pilot sub-carrier locations are given by Table 2 for scatted pilots and FIGS. 6, 10, and 13 for continuous pilots, where the sub-carrier locations in FIG. 6 and FIG. 10 may be derived from the locations given in FIG. 13.

S18: A channel estimation and correction unit estimates an impulse response of a channel through which the OFDM symbols have passed from the recovered pilot symbols and corrects the received data symbols bearing subcarriers using the estimated channel impulse response. Typically this is in accordance with the equalisation technique where the received signal in the frequency domain is divided by a frequency domain representation of the channel impulse response.

S20: A de-mapper recovers the data symbols from the data bearing subcarriers of the OFDM symbols by performing a reverse mapping to that which was performed at the transmitter.

As will be appreciated the transmitter and receiver shown in FIGS. 1 and 3 respectively are provided as illustrations only and are not intended to be limiting. For example, it will be appreciated that the present technique can be applied to a different transmitter and receiver architecture.

As mentioned above, embodiments of the present invention find application with an ATSC standard such as ATSC 3.0, which are incorporated herein by reference. For example embodiments of the present invention may be used in a transmitter or receiver operating in accordance with hand-held mobile terminals. Services that may be provided may include voice, messaging, internet browsing, radio, still and/or moving video images, television services, interactive services, video or near-video on demand and option. The services might operate in combination with one another.

In the proposed ATSC3.0 frame structure, which will be explained in more detail below, OFDM symbols in different physical layer frames may have different subcarrier spacing. Frequency domain frame synchronization in (preamble detection) is thus not readily possible. The preamble symbol (as generated by the L1 signaling unit 15) must therefore be detected in the time domain. It is only after the preamble is decoded and its signaling payload interpreted that frequency domain processing of the frame can proceed. The new preamble fulfills all specific requirements:

Synchronization capabilities;
Offset correction capabilities;
Robustness of signaling;
Protection against interference.

The same preamble is used for all frame types. As shown in FIG. 14 (showing the time domain characteristics of the preamble symbol) it consists of a regular 8 k symbol with an extended guard interval GI (fractional length 57/128). This GI is chosen to map to the longest possible guard interval for a 32 k FFT size, i.e. 57/512). ISI avoidance for all frame types is therefore guaranteed.

For the standard bandwidth (i.e. 6 MHz), the preamble symbol allocates 6912 subcarriers and contains 45 frequency offset estimation pilots at the same locations as the continual pilots of a payload symbol. No other pilots are foreseen. The 6867 payload carriers use BPSK modulation for L1 signaling.

The preamble symbol uses an overlaid time domain pilot signal (SigSeq). This requires good ACF (auto correlation function) properties that allow for accurate frame synchronization and channel impulse response (CIR) estimation. The full-band Channel Transfer Function estimation at the receiver is accordingly calculated from the CIR.

The SigSeq consists of one of two possible constant amplitude zero autocorrelation (CAZAC) sequences in order to allow power efficient EWS. CAZAC sequences have been chosen due to their excellent correlation properties in time and frequency domain as well as their band-limited spectrum behavior. Due to the fixed size of the guard interval the search for preamble can be limited to Ng samples (i.e. the number of samples of the guard interval).

Embodiments of the disclosure provide a receiver configured to recovering data from Orthogonal Frequency Division Multiplexed (OFDM) symbols, wherein the OFDM symbols include a plurality of sub-carrier signals, some of the sub-carrier signals carrying data symbols and some of the sub-carrier signals carrying pilot symbols, the pilot symbols comprising continuous pilots symbols, the continuous pilot symbols being distributed with irregular spacing across the sub-carrier signals in accordance with a continuous pilot symbol pattern, the receiver comprising:

a demodulator configured to detect a signal representing the OFDM symbols, and to generate a sampled digital version of the OFDM symbols in the time domain, a Fourier transform processor configured to receive the time domain digital version of the OFDM symbols and to form a frequency domain version of the OFDM symbols, from which the continuous pilot symbol bearing sub-carriers and the data symbol bearing sub-carriers can be recovered, and a detector configured to recover the data symbols from the data bearing sub-carrier signals of the OFDM symbols and to recover the pilot symbols from the pilot bearing sub-carrier signals of the OFDM symbols in accordance with the continuous pilot symbol pattern, wherein the continuous pilot pattern is independent of the scattered pilot symbol pattern, and the detector comprises a memory configured to store a master continuous pilot pattern and a processor configured to detect the number of sub-carrier signals in the plurality of sub-carrier signals and to derive the continuous pilot pattern from a master pilot pattern based on the number of sub-carrier signals.

Embodiments of the disclosure provide a transmitter for transmitting Orthogonal Frequency Division Multiplexed (OFDM) symbols, wherein the OFDM symbols include a plurality of sub-carrier signals, some of the sub-carrier signals carrying data symbols and some of the sub-carrier signals carrying pilot symbols, the pilot symbols comprising continuous pilot symbols, the continuous pilot symbols being distributed across the sub-carrier signals in accordance with a continuous pilot symbol pattern, the transmitter comprising a pilot signal former configured to generate pilot symbols,
a symbol builder configured to receive a frequency domain data symbol stream and embed the generated pilot symbols from the pilot signal former into the sub-carrier signals of the data symbol stream pilot symbols in accordance with the continuous pilot symbol pattern, and an OFDM modulator configured to generate a time domain version of the signal embedded with pilot symbols, and wherein the pilot signal former comprises a memory configured to store a master continuous pilot pattern and a processor configured to detect the number of sub-carrier signals in the plurality of sub-carrier signals and to derive the continuous pilot pattern from a master pilot pattern based on the number of sub-carrier signals.

Various further aspects and features of the present disclosure are defined in the appended claims. Various combinations of features may be made of the features and method steps defined in the dependent claims other than the specific combinations set out in the attached claim dependency. Thus the claim dependencies should not be taken as limiting.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

The invention claimed is:

1. A receiver configured to recover data from Orthogonal Frequency Division Multiplexed (OFDM) symbols, the OFDM symbols including a plurality of sub-carrier signals, some of the sub-carrier signals carrying data and some of the sub-carrier signals carrying pilots, the pilots comprising continual pilots, the continual pilots being distributed across the sub-carrier signals in accordance with a continual pilot pattern selected from a plurality of continual pilot patterns including a first continual pilot pattern and at least one second continual pilot pattern derived from the first continual pilot pattern, the receiver comprising:
a demodulator configured to detect a signal representing the OFDM symbols and to generate a digital version of the OFDM symbols in a time domain;
a transform processor configured to receive the time domain digital version of the OFDM symbols and to form a frequency domain version of the OFDM symbols, from which the sub-carrier signals carrying pilots and the sub-carrier signals carrying data can be recovered; and
a detector configured to:
determine a number of sub-carrier signals in the plurality of sub-carrier signals,
determine the continual pilot pattern of the OFDM symbols based on the number of sub-carrier signals, and
recover the data and the pilots from the sub-carrier signals.

2. The receiver as claimed in claim 1, wherein:
the continual pilot pattern of each of the OFDM symbols is selected in accordance with the number of sub-carrier signals of each of the OFDM symbols,
the number of sub-carrier signals is one of a set of numbers of sub-carrier signals, the set of numbers of sub-carrier signals including a first number of sub-carrier signals for which the first continual pilot pattern is selected and at least one second number of sub-carrier signals for which the at least one second continual pilot pattern is selected, and
the first number is greater than the at least one second number.

3. The receiver as claimed in claim 2, wherein:
the set of numbers of sub-carrier signals includes 8 k (8192), 16 k (16384), and 32 k (32768), corresponding to an 8 k mode, a 16 k mode, and a 32 k mode, respectively, and the continual pilot patterns for 8 k and 16 k sub-carrier signals are derived from the continual pilot pattern for 32 k sub-carrier signals.

4. The receiver as claimed in claim 3, wherein:
a number of pilots in the continual pilot pattern for 8 k sub-carrier signals is at least 45,
a number of pilots in the continual pilot pattern for 16 k sub-carrier signals is at least 90, and
a number of pilots in the continual pilot pattern for 32 k sub-carrier signals is at least 180.

5. The receiver as claimed in claim 3, wherein the detector is configured to determine the continual pilot pattern according to one or more of the equations:

$$CP\_8Kpos = round(CP\_32K\_pos(1:4: last\_32k\_cp\_pos)/4), \text{ and}$$

$$CP\_16K\_pos = round(CP\_32K\_pos(1:2: last\_32k\_cp\_pos)/2),$$

wherein CP_8K is the continual pilot pattern for 8 k sub-carrier signals, CP_16K is the continual pilot pattern for 16 k sub-carrier signals, and CP_32K is the continual pilot pattern for 32 k sub-carrier signals.

6. The receiver as claimed in claim 1, wherein the detector is configured to determine the number of sub-carrier signals by using signaling information received in connection with the OFDM symbols or by detecting one or more signal characteristics.

7. The receiver as claimed in claim 1, wherein the pilots comprise scattered pilots distributed across the sub-carrier signals in accordance with one of a plurality of scattered pilot patterns having repetition parameters Dx=4, Dy=2; Dx=4, Dy=4; Dx=8, Dy=2; Dx=16, Dy=2; or Dx=32, Dy=2.

8. The receiver as claimed in claim 1, wherein the pilots comprise scattered pilots with locations that do not coincide with locations of the continual pilots.

9. The receiver as claimed in claim 1, wherein the pilots comprise scattered pilots distributed across the sub-carrier signals in accordance with a scattered pilot pattern that is independent of the continual pilot pattern.

10. The receiver as claimed in claim 1, wherein the OFDM symbols comprise first OFDM symbols, which include a first number of sub-carrier signals, and second OFDM symbols, which include a second number of sub-carrier signals, the second number of second sub-carrier signals being the same or greater than the first number of sub-carrier signals, wherein the continual pilots are present at identical sub-carrier locations in the first OFDM symbols and the second OFDM symbols.

11. A method for recovering data from Orthogonal Frequency Division Multiplexed (OFDM) symbols, the OFDM symbols including a plurality of sub-carrier signals, some of the sub-carrier signals carrying data and some of the sub-carrier signals carrying pilots, the pilots comprising continual pilots, the continual pilots being distributed across the sub-carrier signals in accordance with a continual pilot pattern selected from a plurality of continual pilot patterns including a first continual pilot pattern and at least one second continual pilot pattern derived from the first continual pilot pattern, the method comprising:
detecting a signal representing the OFDM symbols;
generating a digital version of the OFDM symbols in a time domain;
receiving the time domain digital version of the OFDM symbols and forming a frequency domain version of the OFDM symbols, from which the sub-carrier signals carrying pilots and the sub-carrier signals carrying data can be recovered;

determining a number of sub-carrier signals in the plurality of sub-carrier signals;
determining the continual pilot pattern of the OFDM symbols based on the number of sub-carrier signals; and
recovering the data and the pilots from the sub-carrier signals.

12. The method as claimed in claim 11, wherein:
the continual pilot pattern of each of the OFDM symbols is selected in accordance with the number of sub-carrier signals of each of the OFDM symbols,
the number of sub-carrier signals is one of a set of numbers of sub-carrier signals, the set of numbers of sub-carrier signals including a first number of sub-carrier signals for which the first continual pilot pattern is selected and at least one second number of sub-carrier signals for which the at least one second continual pilot pattern is selected, and
the first number is greater than the at least one second number.

13. The method as claimed in claim 12, wherein:
the set of numbers of sub-carrier signals includes 8 k (8192), 16 k (16384), and 32 k (32768), corresponding to an 8 k mode, a 16 k mode, and a 32 k mode, respectively, and
the continual pilot patterns for 8 k and 16 k sub-carrier signals are derived from the continual pilot pattern for 32 k sub-carrier signals.

14. The method as claimed in claim 13, wherein:
a number of pilots in the continual pilot pattern for 8 k sub-carrier signals is at least 45,
a number of pilots in the continual pilot pattern for 16 k sub-carrier signals is at least 90, and
a number of pilots in the continual pilot pattern for 32 k sub-carrier signals is at least 180.

15. The method as claimed in claim 13, wherein the continual pilot pattern is determined according to one or more of the equations:

$$CP\_8K\_pos = round(CP\_32K\_pos(1:4:last\_32k\_cp\_pos)/4), \text{ and}$$

$$CP\_16K\_pos = round(CP\_32K\_pos(1:2:last\_32k\_cp\_pos)/2),$$

wherein CP_8K is the continual pilot pattern for 8 k sub-carrier signals, CP_16K is the continual pilot pattern for 16 k sub-carrier signals, and CP_32K is the continual pilot pattern for 32 k sub-carrier signals.

16. The method as claimed in claim 11, wherein determining the number of sub-carrier signals includes using signaling information received in connection with the OFDM symbols or detecting one or more signal characteristics.

17. The method as claimed in claim 11, wherein the pilots comprise scattered pilots distributed across the sub-carrier signals in accordance with one of a plurality of scattered pilot patterns having repetition parameters $D_x=4$, $D_y=2$; $D_x=4$, $D_y=4$; $D_x=8$, $D_y=2$; $D_x=16$, $D_y=2$; or $D_x=32$, $D_y=2$.

18. The method as claimed in claim 11, wherein the pilots comprise scattered pilots with locations that do not coincide with locations of the continual pilots.

19. The method as claimed in claim 11, wherein the pilots comprise scattered pilots distributed across the sub-carrier signals in accordance with a scattered pilot pattern that is independent of the continual pilot pattern.

20. The method as claimed in claim 11, wherein the OFDM symbols comprise first OFDM symbols, which include a first number of sub-carrier signals, and second OFDM symbols, which include a second number of sub-carrier signals, the second number of second sub-carrier signals being the same or greater than the first number of sub-carrier signals, wherein the continual pilots are present at the same identical sub-carrier locations in the first OFDM symbols and the second OFDM symbols.

21. A non-transitory computer-readable medium storing a computer program having computer executable instructions, which when executed by a computer causes the computer to perform the method according to claim 11.

* * * * *